United States Patent [19]

Heitlinger et al.

[11] 3,925,762

[45] Dec. 9, 1975

[54] PATIENT MONITORING AND DATA PROCESSING SYSTEM

[75] Inventors: Louis J. Heitlinger, Waukesha; John P. Bahr, Wauwatosa; John H. Smith, Milwaukee; Thomas W. Anderson, Greendale, all of Wis.

[73] Assignee: General Electric Company, Schenectady, N.Y.

[22] Filed: Oct. 25, 1973

[21] Appl. No.: 409,738

[52] U.S. Cl. ................................................ 340/150

[51] Int. Cl.[2].. H04J 3/00; H04J 6/00; H04Q 11/04; H04Q 5/00

[58] Field of Search...... 340/172.5, 150; 179/18 FF, 179/15 AL, 15

[56] References Cited

UNITED STATES PATENTS 3,757,050 9/1973 Mizote............................ 179/15 AL

*Primary Examiner*—Gareth D. Shaw
*Assistant Examiner*—Michael C. Sachs
*Attorney, Agent, or Firm*—Ralph G. Hohenfeldt; Fred Wiviott

[57] ABSTRACT

A physiological monitoring system for use with patients who are critically ill utilizes a system structure which is inherently modular, easily expandable, computer compatible, and "fail soft". The system is composed of bedside units, central station units and a central processing unit. Patient information such as dynamic waveforms, derived physiological parameters, physiological alarms, trend graphs and multiparameter plots are provided in addition to such system information as alarm limits and system alarms. The system structure is based upon use of digital data buses which interconnect the units located at the bedside, central station and central processor. The digital data buses provide two-way communication between the system units and yet have a relatively small number of conductors for the amount of information exchanged between the units. The digital data buses are operated in a synchronous mode wherein data words appear on the buses in a predetermined time relationship relative to repetitive synchronizing pulses. Both the transmitter which is generating a given data word on a given data bus and all intended receivers of the data, access that given data word simultaneously after each has counted the same number of intervals from the synchronizing pulse to the predetermined time slot.

45 Claims, 12 Drawing Figures

BIT

| WORD | PARITY | B7 | B6 | B5 | B4 | B3 | B2 | B1 | B0 |
|---|---|---|---|---|---|---|---|---|---|
| $C_A$ | PAR | | | | $R_4$ | $R_3$ | $R_2$ | $R_1$ | $R_0$ |
| $C_B$ | PAR | | | $C_5$ | $C_4$ | $C_3$ | $C_2$ | $C_1$ | $C_0$ |
| $C_C$ | PAR | | | $CG_5$ | $CG_4$ | $CG_3$ | $CG_2$ | $CG_1$ | $CG_0$ |
| $C_D$ | PAR | | | | BEDSIDE ENABLE | RIGHT INHIBIT | LEFT INHIBIT | GRAPH-ICAL | SIZE |
| $P_A$ | PAR | SYSTEM ALARM 1 | SYSTEM ALARM 2 | PARAM-ENTER SELECT | $P_4$ | $P_3$ | $P_2$ | $P_1$ | $P_0$ |
| $P_B$ | PAR | SYSTEM ALARM 3 | SYSTEM ALARM 4 | SIGN BIT | $P_9$ | $P_8$ | $P_7$ | $P_6$ | $P_5$ |
| $P_C$ | PAR | TREND LIMIT ALARM | SIGN BIT | $T_5$ | $T_4$ | $T_3$ | $T_2$ | $T_1$ | $T_0$ |
| K | PAR | $K_7$ | $K_6$ | $K_5$ | $K_4$ | $K_3$ | $K_2$ | $K_1$ | $K_0$ |
| $W_A$ & $W_B$ | PAR | $W_7$ | $W_6$ | $W_5$ | $W_4$ | $W_3$ | $W_2$ | $W_1$ | $W_0$ |
| $F_A$ | | HI LIMIT ALARM | LO LIMIT ALARM | | BLANK PAGE CONFIRM | | | | |
| $F_B$ | | $W_A$ | $W_B$ | SUS BED A | R-WAVE BED A | SUS BED B | R-WAVE BED B | | |
| $DL_{AA}$ | | | ALARM HOLD | SYSTEM TEST | PHVCO CHART ALARM | | | STRIP CHART ON BED A | STRIP CHART ON BED B |
| $DL_{AB}$ | | | | | BEDSIDE FREEZE TRACE | BEDSIDE DISPLAY SIDE 1 | BEDSIDE DISPLAY SIDE 2 | BEDSIDE FIELD 2 | BEDSIDE FIELD 1 |
| $DL_{AC}$ | | | | | CENTRAL FREEZE TRACE | CENTRAL DISPLAY SIDE 1 | CENTRAL DISPLAY SIDE 0 | CENTRAL MERGE FIELD 2 | CENTRAL MERGE FIELD 2 |
| $DL_{AD}$ | | | | | | | | | |

FIG.7

PATIENT MONITORING AND DATA PROCESSING SYSTEM

BACKGROUND OF THE INVENTION

This invention relates to a system for acquiring, processing, storing, transmitting and displaying data relative to the physiological condition of a critically ill patient in a hospital.

The first generation of patient monitoring apparatus comprised sensors attached to the patient to provide analog signals such as the electrocardiogram (ECG), blood pressure, temperature, and others. Detected analog signals were amplified and processed and displayed essentially as analog signals on devices such as oscilloscopes, calibrated meters and strip chart recorders. Initially, this apparatus was located at the bedside of the patient. In more advanced installations, a number of bedside units were connected to a central station which had analog display devices. This permitted medical personnel at the central station to monitor the dynamic waveforms of several patients simultaneously and to monitor perhaps one or two other physiological parameters such as heart rate and respiration rate. Whenever a certain monitored parameter from a certain patient exceeded a preset limit, an audio alarm notified medical personnel of the problem. Thus, the first generation of patient monitoring apparatus was primarily a collection of analog units each performing a single function. In addition, all data was transmitted in analog from between the bedside and the central station.

The above-mentioned patient monitoring systems have several disadvantages. Among them is that only the primary parameters such as heart rate, systolic pressure, mean pressure and the like are derived from the dynamic waveforms because of the limitations of analog processing. Data could not be stored in the best form. Only dynamic waveforms could be stored and reviewed later when some alarm condition or anomaly occurred. Data transmission was limited. A separate analog line was required for each waveform and each derived parameter to be transmitted from any bedside to the central station. Analog lines are susceptible to noise interference and signal attenuation over a long distance. Any communication from the central station to the bedside station required separate analog lines from those used to transmit physiological data from the bedside to the central station. Large amounts of physiological or other data needed for optimum patient care required a number of cables or an exceedingly large multi-conductor cable to interconnect the bedside monitors with the central station.

Further disadvantages were inherent in data display. Each derived parameter to be displayed simultaneously at the bedside or at the central station required a separate meter or numeric display device. When a number of physiological parameters and waveforms were required for optimum patient care, the amount of display hardware needed to monitor the patient became excessive, distracting and more difficult for medical personnel to monitor.

A further disadvantage in such prior systems as their lack of expandability. Expansion of the number and type of waveforms and derived parameters to be monitored at the bedside, once the initial units were installed, required additional amplifiers, processors and display devices or had to be modifications of the existing display devices to share them. Taking either of these approaches to expansion of the system was costly, inconvenient and difficult. Expansion of the monitoring capability at the central station usually required additional cables and additional display devices to be installed which is again a task of major proportions.

A second generation of patient monitoring apparatus was designed to overcome some of the disadvantages in data processing, storage and display of the first generation of patient monitoring systems. The second generation system added a central processor to the previously existing bedside and central station units. The system was thus endowed with a capability for deriving more complex physiological parameters by way of computer programs, storing derived parameters for later review by medical personnel, and generating graphs and/or hard copy of stored data.

Among the disadvantages of the second generation patient monitoring systems are that they had the same limitations on data transmission between the bedside and central station units as the initial systems. An additional set of analog lines were required to transmit each distinct waveform and each distinct derived parameter to the central processor. A separate set of digital lines were required from the central processor to the digital display.

The problems relative to data display in the first systems were not overcome in the second systems. In order to display parameters derived in the central processor as well as the graphs of stored data, display devices in addition to the analog devices already present were required at the central station and possibly at each bedside station to make the data accessible there. Moreover, the limitations on the analog display devices of the first generation systems were present in the second generation systems.

The second generation systems also lacked a capability for convenient expansion. As in the first system, additional amplifiers, processors, display devices and/or modifications of existing display devices was required.

The second generation systems are not fully compatible with computers or central processors. Since all of the data coming to the computer is analog data, the system must first convert all of the data to digital form before it can be processed or stored and if the computer is used to drive an analog display device, the computer output must be converted from digital to analog form before it is able to control the display device.

SUMMARY OF THE INVENTION

The present invention constitutes a patient monitoring and a data processing system which overcomes the disadvantages and limitations in data transmissions, data display, system expandability and computer compatability of the previously described prior systems while at the same time retains the ability to process and store data found in the second generation system. An important and distinctive feature of this invention is the use of a set of digital data buses and interfaces for two-way transmission of all data between all units in the system. In general, in accordance with the present invention, at the bedside of each patient there is an assembly of subsystems which include sensors, signal conditioners and hybrid processors, means for alphanumeric display, means for dynamic display, a keyboard, and a set of digital interfaces connected to a digital data bus at the bedside. This bedside assembly acquires, processes and displays the current values of up to 10 physiological parameters in numerical form in addition to acquiring and displaying real time waveforms such as blood pressure and ECG. Moreover, the bedside assembly can command the central processor, if one is used in the system, to display at the bedside computer derived parameters and the graphs of stored parameter data.

Up to four bedside assemblies are interconnected with a central station which is attended by one or more qualified medical personnel. Interconnections to the central stations are accomplished by way of a set of digital interfaces between the bedside data buses and the central station data bus. The central station comprises an assembly of subsystems which include a strip chart recorder, an alphanumeric display, a dynamic display, a keyboard and a set of digital interfaces connected to the central stations digital data bus. The central station assembly displays the derived parameters, dynamic waveforms, graphs of stored data and the like for the patients at the four bedside stations served by the central station. In addition, the strip chart recorder at the central station provides hard copy of the ECG waveforms of a specific patient whenever such copy is requested by the medical personnel or automatically whenever alarm limits are exceeded on one or more derived parameters from a patient.

The system may optionally include a central processing unit (CPU) that features a small computer which receives parameter data, keyboard commands from bedside or central station and selected dynamic waveforms and provides as output more complex derived parameters such as cardiac output, stroke volume and data coordinate points for historical graphs. Medical notes, lab reports and program variables and so forth may be entered into the computer with a typewriter style keyboard terminal. This input and output terminal also provides hard copy for any selected computer stored or generated information.

Thus, the new patient monitoring and data processing system is distinguished by its use of digital interfaces and digital data buses arranged in a particular hierachy to intercommunicate information between the bedside station, the central station and the central processor as well as between individual subsystems located at each site. The digital interfaces and digital data buses allow addition or subtraction of subsystems at will since all of the information is carried on the digital data buses as opposed to having dedicated analog lines required for each distinct parameter and waveform. The system is inherently computer compatible because all of the data is communicated in digital format.

An important feature of the system is that the data buses use a low number of conductors compared with the amount of information communicated bidirectionally in the system. All data sources convert information into digital words before transmission and all receivers read digital words. The data sources or senders throughout the system have binary counters which begin counting simultaneously upon occurrence of a synchronizing (sync) pulse which is applied to all of them at the same time so that they all count in synchronism. Generated data words each have a time slot which is identified by a count number with respect to a count initiating sync pulse. The words are gated onto the data buses synchronously and repetitively. The receivers have counters which are all synchronized by the same sync pulse as are the senders so they count correspondingly. Any receiver which is designated to receive a particular word counts the same number as did the sender when the data was gated onto the bus and the receiver is controlled by a logic system as is the sender to open its gates simultaneously to enter and store the data during its short appearance on the bus. In an illustrative embodiment, the data words are presented in a sequence of 16 words which constitute a block and 128 blocks which constitute a train. Each word, thus, has its own time slot and a time slot may be looked upon as a channel for particular information. Because, in the illustrative embodiment, there are 2,048 words in a train and the train is repeated four times per second, a large number of channels are open for conveying digital information. Only about one-half of the 2,048 words have been assigned, in a present commercial embodiment, to a specific piece of data. Therefore, new data requirements such as additional parameters or waveforms and the like can be accommodated easily in the future by assigning them to some unused words on the bus and expanding the system to include new data senders and receivers. No additional data lines are required between the bedside and central station or between central station and central processor.

Accordingly, a general object of this invention is to provide apparatus for accurately and efficiently acquiring, deriving, storing, communicating and displaying patient data.

A further object is to provide a patient data system which permits practically unlimited addition, removal and interchange of functional units so that the system can be expanded or modernized to accommodate different and even yet undeveloped sensors, display devices and other data producing and utilizing devices.

Another object is to transfer data on buses in digital form in various selected modes by using synchronized multiplexing techniques which avoid the need for sending address information to intercommunicate any data sender or receiver.

Another important object is to reduce the number of conductors in the data buses to a small number in view of the large amount of data which is rapidly transferred and used in the system.

Another object is to have individual data buses associated respectively with the bedside stations, the central stations and the CPU stations and to have suitable interfaces between these stations and their associated buses so that, in addition to the system being adapted for easy expansion, it will also be fail soft. Failing soft, as used herein, refers to the effect on the system when any functional block or device fails in which case, in accordance with the invention, the failed unit will not interact adversely with the remainder of the system such that any other unit would be made inoperative. For instance, a bedside station may continue to operate even if there is failure of a unit at the central processing station or the CPU station. In fact, a bedside station could remain operative even though certain information is not available to it due to failure of the CPU station. To further exemplify the flexibility, a central station or CPU station may not even be installed and yet the bedside station would be able to acquire and display physiological data on the respective patients in such stations. This fail soft mode contrasts with known digital systems that have all of its units interconnected with a common bus rather than individual buses.

Still another object of this invention is to improve patient safety by enabling electrical isolation of a patient at a bedside station from remotely located electric sources such as the central and CPU stations. A corollary to this object is that the system is designed for meeting electrical code requirements for avoiding interconnecting patients in one room with electrical apparatus in another room unless positive isolation can be provided which, in the present case, is provided by the interfaces between all buses and their associated units.

How the foregoing and other more specific objects of this invention are achieved will be evidenced in the course of a description of a preferred embodiment of the invention which will be set forth hereinafter in reference to the drawings.

DESCRIPTION OF THE DRAWINGS

FIG. 7 is for explaining the assignment of the bits in the various data words in the illustrative embodiment of the invention;

DESCRIPTION OF A PREFERRED EMBODIMENT

Figure 1:
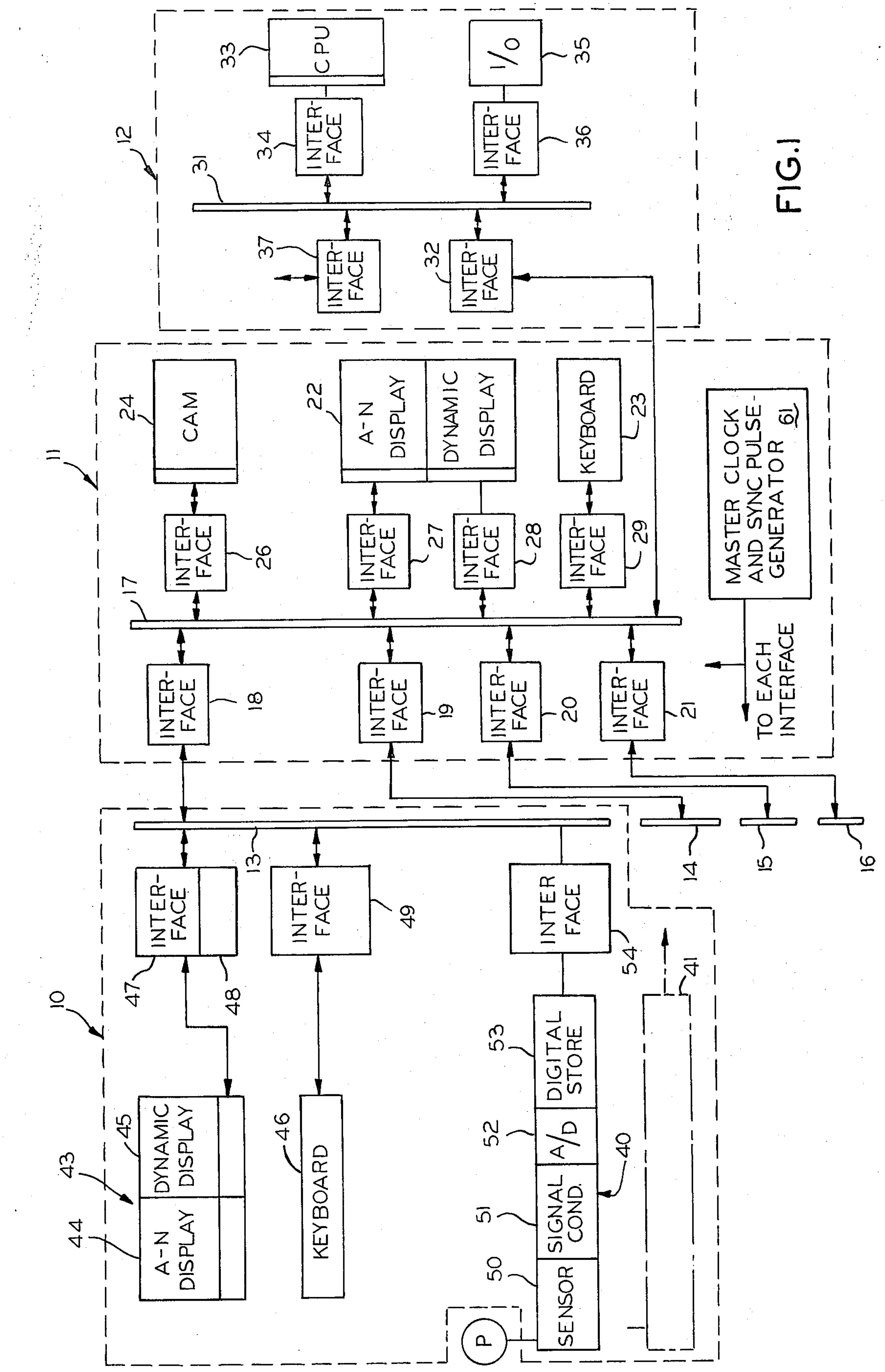
FIG. 1 is a block diagram of the new patient monitoring and data processing system.

FIG. 1 illustrates the general arrangement of the patient monitoring and data handling system. The system comprises three types of stations, a bedside station generally defined by a dashed line block marked 10, a central station defined by a block marked 11 and a central processing unit station (CPU) marked 12. These stations may be separated from each other by a considerable distance in a hospital. There may be several bedside stations 10, one in proximity with each patient who requires the close medical surveillance which the system is intended to provide. Each bedside station has the capability for deriving physiological information about a patient, transmitting and receiving information to other destinations and from other sources and for displaying information. Various functions of the system may be controlled from the bedside station 10 and from the central station 11 as will be explained.

As indicated, one purpose of each bedside station is to derive physiological data from the patient. Examples of such data are the patient's heart rate, electrocardiograph (ECG), blood pressure, temperature, partial pressure of both carbon dioxide and oxygen in the patient's blood, blood pH and the like. Some of this data is obtained in a form that allows it to be displayed directly at the bedside station. Other data is processed in the CPU 12 and returned to either or both the bedside station 10 or central station 11 for display or other use. The CPU 12 has the capability for using patient physiological parameter data to compute or derive parameters in other forms which may be displayed at bedside or at the central station. Typically there are up to four bedside stations 10 for each central station 11. The CPU is an optional feature. It may be disconnected or not installed but the system will still have a good capability for measuring, communicating and displaying data. A central station 11 may not be wanted in small hospitals for economic or other reasons. The central station and CPU can both be eliminated. One or more bedside units would, of course, always be necessary. An important advantage of the system is its flexibility which permits omission or additions of stations or devices within stations. This is due largely to the use separate data buses in the stations and to the manner in which data is transmitted according to the invention.

Each bedside station 10 has a data bus 13 on which all information is transferred to and from the station in digital form. Other associated bedside stations would have buses such as 14, 15 and 16 which are shown fragmentarily to merely suggest their existence.

The bedside station buses are interconnected with a common central station bus 17 by means of suitable interface units 18–21 which will be described in detail later. The central station has a display unit 22 comprised essentially of a pair of oscilloscopes on one of which alphanumeric (A-N) information concerning a patient may be displayed on command of the attendant and on the other of which certain waveforms such as ECG and blood pressure may be displayed dynamically in realtime. The central station also has a keyboard 23 of a specialized type by means of which the attendant may issue system commands. The central station also has a central auxiliary module (CAM) 24 which includes a chart recorder that may be activated automatically or upon command to record current physiological information. The CAM 24 also has visual and audible alarms which are activated when certain of the physiological parameters of the patient exceed preset limits. The various devices 22–24 in the central station are connected with bus 17 by suitable interface units 26–29, as shown, to allow exchange of digital data between the bus and devices.

Central station bus 17 is interconnected with a bus in CPU station 12 through a suitable interface 32. An interface unit 34 couples the CPU 33 with bus 31. CPU station 12 has a central processing unit 33 which is a small digital computer. The CPU receives preprocessed data, provides more complex derived parameters, and stores pertinent patient information. The computer receives derived parameter data, keyboard commands and selected dynamic waveforms and provides output data representative of more complex derived parameters such as cardiac output, stroke volume and historical graphs. The computer may store such medical data as fluid intake and output together with patient treatment information when the system is set to the medical data mode. In the CPU station there is an input-output (I/O) device 35 for entering medical notes, patient admission data, lab reports and program variables and the like. The device 35 is coupled with bus 31 by means of an interface unit 36. This device or terminal 35 also provides selected computer stored or generated data in hard copy form. The CPU station 12 may also be adapted to service other central stations similar to station 11 by merely connecting its data bus 31 to the other central station with a suitable interface such as the one marked 37 in FIG. 1. In the system all interface-bus connections may be made with connectors or cables having the same small number of conductors as the buses. These connections are indicated with arrowhead lines in FIG. 1.

Before discussing in detail the manner in which data is communicated and used in the system, additional general characteristics of the bedside station 10 in FIG. 1 will be examined. Each bedside station has a number of function blocks typified by one marked 40. It will be understood that there may be as many function blocks as there are unique types of physiological parameter or other data to be handled. For instance, there would be separate function blocks for ECG, blood pressure, body temperature, blood gases such as $CO_2$ and $O_2$ and so forth. An important feature of the invention is that these function blocks may be easily plugged in and removed from the bedside data bus 13 so a system may employ the function blocks for measuring physiological parameters which are most appropriate to the type of care which the particular patient needs. The plug-in feature facilitates expansion of the system as patient numbers increase. It also permits adding function blocks for parameters which may be of medical interest in the future or for which the sensors have not as yet been developed.

A typical function block 40 comprises a sensor 50 which derives physiological information from a patient P and produces electric signals for a waveform corresponding with a physiological parameter. For instance, the sensor could be a blood pressure transducer which converts pressure variations to a waveform signal. Whatever form of signal is derived is usually amplified or otherwise processed in what is denoted a signal conditioning module 51. For instance, an analog ECG signal is in the low millivolt range and it is necessary to amplify it and filter it to eliminate 60 HZ interference or noise and to emphasize its fundamental frequency of about 28 HZ before this analog signal is converted to a digital signal. The required amplifier and filter circuits are conventional and well known to those involved in the biomedical electronics arts. The conditioned parameter signal is then converted from its analog form to binary digital form in an analog-to-digital (A/D) converter 52 as all information is sent and received in digital form in the new patient data system. A desirable A/D converter is the ramp type described in U.S. Pat. No. 3,051,939 dated Aug. 28, 1962. In a commercial embodiment a model ZD 461 converter which is a successive approximation type, made by Zeltex, Inc., 1000 Chalomar Road, Concord, Cal., was successfully used. Further information on A/D conversion is obtainable from the book "Computers in Biomedical Research", Academic Press, 1965, Vol. 2, Editors R. W. Stacy and B. D. Waxman, see particularly, Section A-1, authored by Josiah Macy, Jr. The digital signals are then stored in a register or other storage device which is marked 53. The register may comprise two four-bit latches such as type 74175 which is available from several manufacturers. In this system information is usually stored for a short interval at least at the sending and receiving points since it cannot be put on the data buses randomly but must be put on and taken off in the proper time slot or in a synchronous mode. The synchronous mode of data transmission used therein enables removal and addition of stations and functional blocks without doing any rewiring as will be more evident hereafter. Functional unit 40 is coupled with bedside data bus 13 with an interface unit 54 which controls data transfer as will be explained.

Data derived with the function blocks may be displayed in various forms by means of a display unit 43 which is associated with each bedside station. Display 43 is similar to display 22 in the central station 11 and comprises suitable electronic circuitry for getting data into the proper format and displaying it on a pair of bedside oscilloscopes 44 and 45. The left oscilloscope 44 is used in one embodiment for displaying alphanumeric data and alarm information and the oscilloscope 45 is used for displaying some physiological data along with waveforms representative of physiological parameters. Display unit 43 is coupled to data bus 13 with suitable interface units 47 and 48. Each bedside station also has a keyboard 46 for dictating commands to the system such as selecting certain data for display and for communicating with the central station 11. Keyboard 46 is coupled to bus 13 with an interface unit 49. The keyboard 46 also has controls, not shown, for testing the various physiological data processors of the system. For instance, when the proper calibration switches are operated, the function blocks are referred to standard built-in references and a predetermined number for each derived parameter is displayed if the physiological processor and its associated circuitry is properly calibrated.

In the new system all data is communicated in digital form using buses 13 and 17 which use few conductors considering the amount of information and the speed with which it is transferred. Bus 31 in the CPU may have more conductors than 13 and 17. The buses are interconnected with buses having a similar number of conductors which are indicated by arrowhead lines in FIG. 1. Data communication is in the synchronous mode so that no digital addresses need be sent to transmit or receive data. Each data word has its own unique time slot. Since the use of the customary address information is avoided, the bit rate is lower and greater immunity to noise is obtained. The availability of a large number of unused time slots makes them available for system expansion. Removal of any data generating or receiving unit merely clears some time slots. Most data is on the data buses repeatedly so there is a high degree of redundancy and single bit interferences or transmission errors are of no consequence. The system is thus unique in the way it permits subsystems to communicate with each other.

The data communication features of the system will now be considered. Functions of the data communication system are to transmit system commands from the keyboards and CPU to all other parts of the system, to transmit data from the function blocks to the display format generators and CPU and from the CPU to the format generators, to transmit system alarm messages from the various system components to the displays and CPU and, to synchronize the operation of the various subsystems.

A basic feature of the system is that data sending units place digital data on the buses in a predetermined sequence and any receiving unit that is supposed to receive particular data words or bits is controlled to gate only the particular data in simultaneously with its transmission. Thus, every data source or sending unit is subject to the control of a clock pulse train. Each sending and receiving unit has a counting device. A common synchronizing pulse is generated and applied to all counters so that they begin counting from time zero simultaneously. The counters are associated with decode controls which enable gating data from a particular sending unit onto the buses in preassigned time slots for the various data words that are generated by the sending units. The designated receivers for the data are similarly provided with counters and decode controls which are synchronized by making a corresponding number of counts to gate the data then appearing on the bus into storage for realtime or subsequent use. In one practical embodiment, the clock frequency is 65,536 Hz. The sync code is phase modulated on the clock signal as a unique code covering two clock periods. This code is repeated to produce one sync pulse every 16,384 clock periods or every 250 milliseconds. Each sync pulse is followed by a data word train of 2,048 digital words or time slots for such words which are, of course, repeated four times per second. Only an extremely large system would actually use anywhere near this word capacity so generally there are many time slots open and available for any additional devices which a user may want to install to enlarge system capacity. Each data transfer over the system data bus takes place at a predetermined time established by counting a specific number of clock periods following a system sync pulse. Since each data bus interface receives the same sync code, and each interface is tied to the same clock line, each interface will use the same amount of time to count and will cause every receiver that is programmed to receive data from the bus to turn on at almost exactly the same time as the data is transmitted by the source unit. In this typical system, data words may appear on the buses for 120 microseconds and the programmed receivers have that much time to take the data off.

The bus structures 13–17 and 31 are only 10 lines wide or, in other words, comprise 10 conductors in one practical embodiment. There are eight lines for the basic data format which is composed of individual eight bit words or bytes and there is a ninth line for a parity bit. The tenth line handles the clock pulses and the periodically appearing sync pulse code. Each data entry is composed of one or more words in straight binary, octal or binary coded decimal form as required. The data structure and format and the synchronous manner in which data is communicated will be described in greater detail later. At present, a typical data sender and receiver, called a function block 40 in the bedside station 10 of FIG. 1 will be discussed to illustrate how typical data words are composed, transmitted and received.

Typical function block 40 is comprised of a number of subblocks which are marked with the numerals 50–53. The function block includes a sensor 50 which is responsive to some physiological parameter such as blood pressure, ECG, temperature or the like. A variety of sensors are known to those skilled in the art so they need not be elaborated. A sensor usually produces an analog voltage or current that is functionally related to parameter variations. The analog signals are usually processed in a signal conditioner 51 which may be simply an impedance matching amplifier. In accordance with the invention, the analog signals are converted to digital form in a substantially conventional analog-to-digital converter 52. The digital data is usually stored in a suitable memory which may be a latch or register, symbolized by block 53, so this data may be available for transfer to another place of use in the system as required. The stored digital data may comprise a digital word representing the parameter value derived from the sensor 50. The data is transferred to bedside bus 13 through an interface unit 54 which puts data on the bus in the appropriate time slot. Interfaces are also used to take digital data from a bus at the appropriate time.

The interface 54 may include a parity bit generator and checker, not shown in FIG. 1, to add a zero or a 1 to the binary word to make the total of the digits an odd number. Functional units in the receivers, of course, have a conventional parity bit checker which determines whether an error has been made in data transmission by determining whether the digits are still odd when they are received.

The data words generated by a function block, such as block 40 in FIG. 1, or generated by any of the data producing units such as the keyboards 46 and 23 and the CPU 33, are gated to the various buses in the proper time slot relative to system synchronizing pulses from a master clock pulse and sync pulse generator 61 at the central station but may be at any station to which may provide the timing for the entire system including the components in bedside station 10, central station 11, CPU station 12. Each bedside station can also have its own clock and sync pulse generator, not shown, so if the generator at the central station is disconnected or fails, each bedside station will continue running on its own clock without loss of the monitoring function at the patient's bedside. This is another example of failing soft. Any interface and its associated digital data utilization device is also controlled by clock and sync pulses to gate data from the buses. As will be explained, some of the interfaces are adapted to gate digital data to and from the buses. In the present system, the synchronizing pulses are encoded in the train of clock pulses and transmitted throughout the system.

The clock and sync pulse generator will now be described in connection with the schematic diagram thereof shown in FIG. 2 and in reference to the waveforms shown in FIG. 4. This will be followed by a description of the clock and sync pulse decoder which is depicted in FIG. 3.

Figure 2:
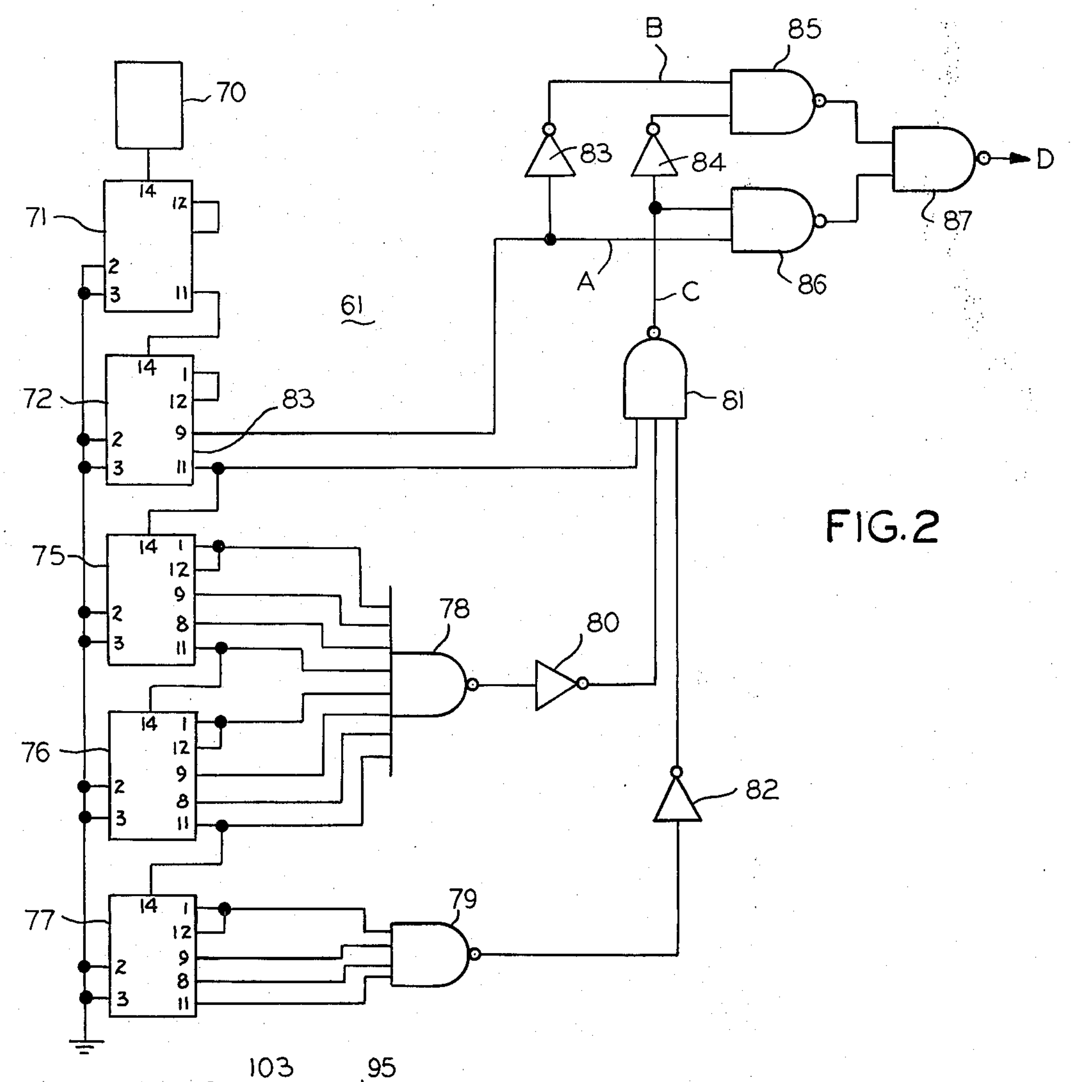
FIG. 2 is a diagram of a clock and synchronizing pulse encoder used in the system.

In FIG. 2, a crystal oscillator 70 is used to generate a stable clock frequency which is divided down by two four-bit binary counters 71 and 72 to produce a clock frequency which, in a practical embodiment, was chosen to be 65,536 Hz. This clock frequency appears on pin 9 of counter 72 and the line leading therefrom is designated line A. The clock frequency waveform is similarly designated line A in FIG. 4. This clock frequency is divided down 14 more levels by a group of counters 75, 76 and 77. The outputs of the counters 75–77 constitute inputs to a pair of NAND gates 78 and 79. These gates have inverters 80 and 82, respectively, connected in series with their outputs. The outputs of the inverters are connected to a pair of input terminals of another NAND gate 81. The third input terminal to NAND gate 81 connects to pin 11 of counter 72. The counting levels of counters 72 and 75–77 are so chosen that when their outputs attain logic 1 simultaneously, the inputs to NAND gate 81 are all at logic 1 and the output thereof, line C, is logic 0. In this particular example, this occurs every 250 milliseconds, or every 16,384 clock periods. The phase relationship of the signal on line C relative to the clock frequency in line A is shown in FIG. 4. The clock frequency on line A is inverted by an inverter 83 whose output is designated line B and its waveform is similarly designated in FIG. 4. The outputs of inverters 83 and 84 connect to the dual inputs of NAND gate 85. Line A and line C are respectively connected to the inputs of another NAND gate 86. Line C acts as an enable line to gates 85 and 86 with only one gate being enabled at any one time. When line C is logic 1, gate 86 is enabled, allowing line A to appear on line D. When line C is logic 0, gate 85 is enabled, allowiing the inverted line A (line B) to appear on line D, thus causing a phase reversal everytime line C is at logic 0 which is during two clock pulses each 250 milliseconds. The phase modulated signal is similarly designated in FIG. 4. Line D constitutes the sync code. The clock/sync signal that goes out on line D is distributed to all data bus interfaces in the system where it is decoded by the clock/sync decoder circuit shown in FIG. 3 which will now be described.

Figure 3:
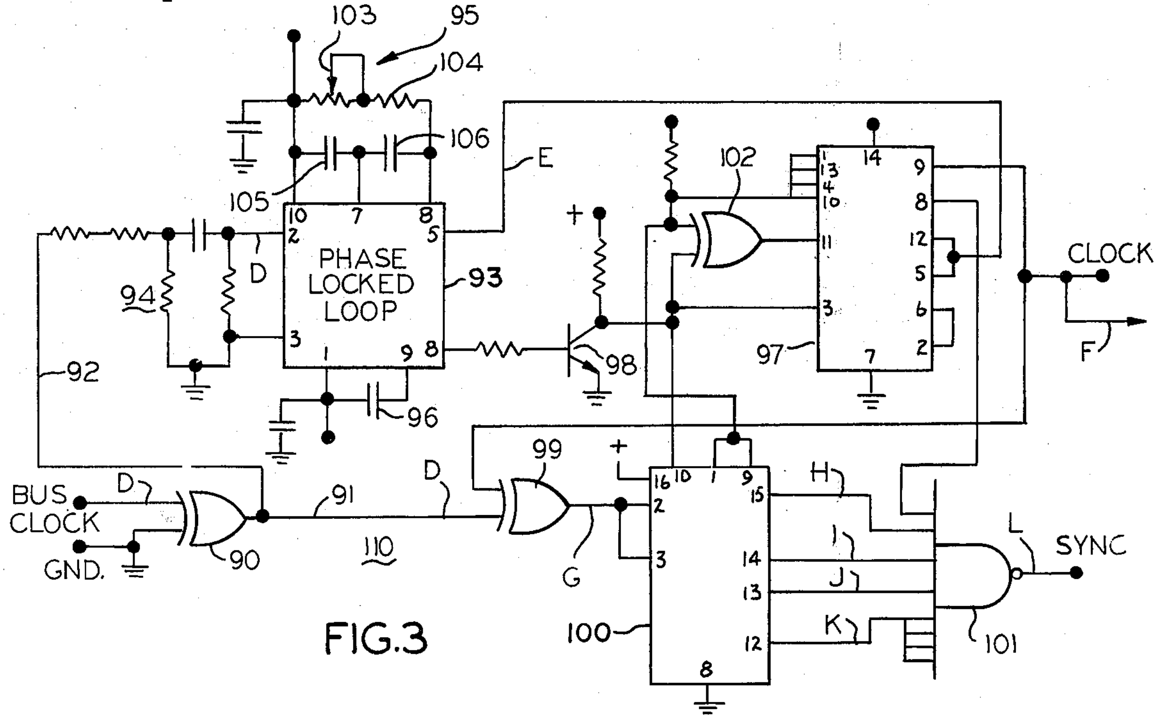
FIG. 3 is a diagram of a clock and synchronizing pulse decoder used in the system.
Figure 4:
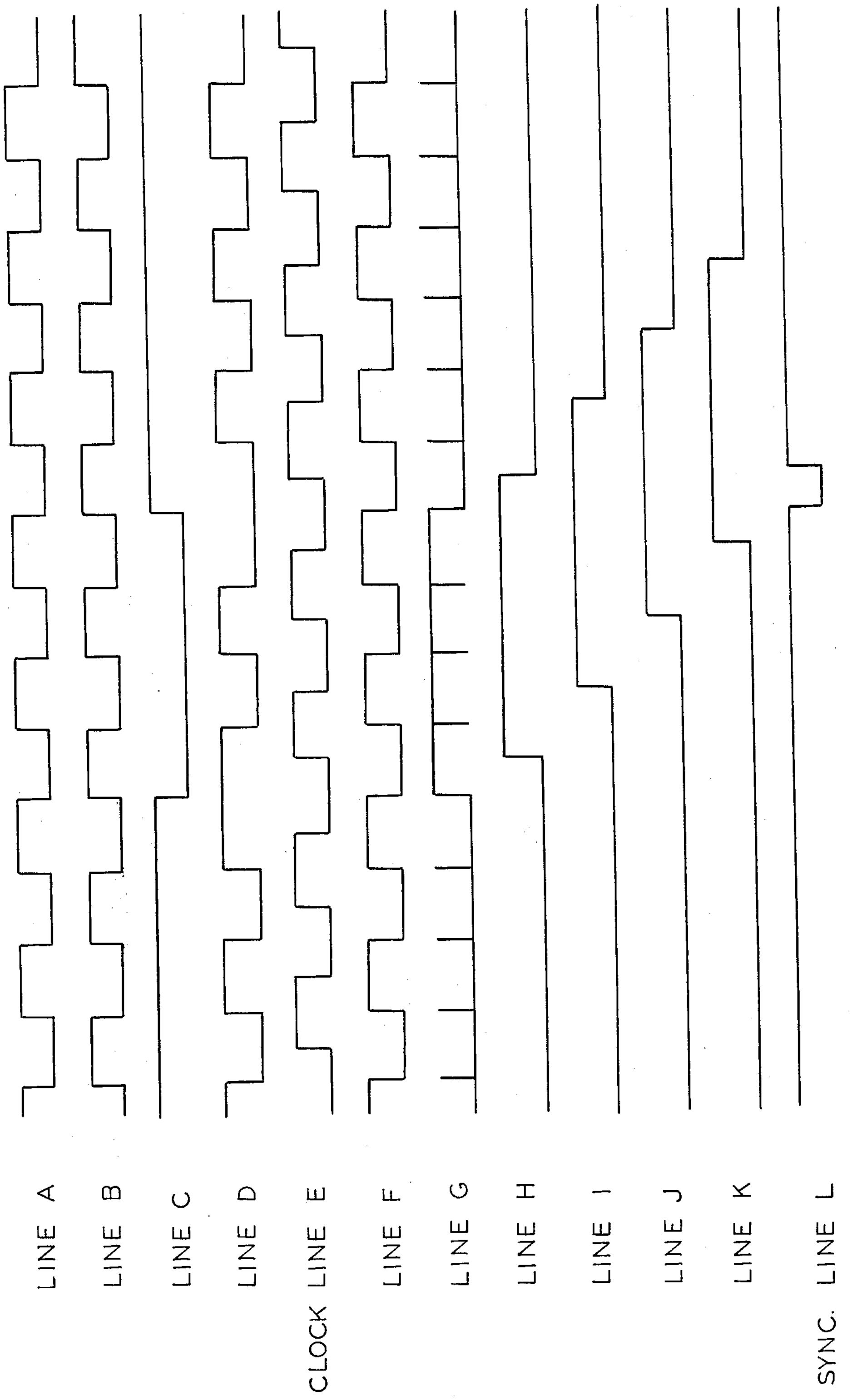
FIG. 4 shows the waveforms incidental to operation of the decoder in the preceding figure.

The basic concept of the decoder circuit shown in FIG. 3 is to use a phase-lock loop circuit to produce a stable phase reference signal. This phase reference signal is compared to the phase modulated clock/sync signal to decode the periodic sync code.

In FIG. 3, the phase modulated signal on line D is applied as one input to an exclusive OR gate 90 which acts as a noninverting buffer. Thus, the same line D signal appears on line 91 and 92 as the output from gate 90. The signal on line 92, which is the same as on line D, is applied to a phase-lock loop 93 through a filter circuit 94 which is primarily a voltage divider to bring the voltage on line 92 from 5 volts to 1 volt in this design. The circuit 95 includes a potentiometer and a series connected resistor which set the free running frequency of the phase lock 93 in conjunction with the capacitor 96. The two capacitors 105 and 106 in circuit 95 have to do with stability and the capture range of the phase lock. Its phase comparison circuit requires a reference signal that is 90° out of phase with its input signal in order to give a stable output. The output from the phase-lock loop is coupled to a phase shifter 97 through a transistor 98 and an exclusive OR gate which acts as an inverter. Integrated circuit phase shifter 97 is a type 7474 flip-flop. Pins 12 and 5 of phase shifter 97 are connected with phase-lock loop 93 by means of line E on which the reference signal is 90° out of phase with the clock/sync phase. This is used to control the phase-lock loop circuit. The line E signal waveform and its phase relationship is illustrated in FIG. 4. Phase shifter 97 produces another output which is the clock frequency appearing on line F and has the phase relationship illustrated by its waveform in FIG. 4. The signal on line F, which is in phase with the clock/sync line, is used to demodulate the sync signal.

Adequate information on phase-locked loops (PLL) is obtainable from the book "Analog Integrated Circuit Design" by A. B. Grebene, Van Nostrand Rheinhold Co., 1972, Library of Congress Catalog Card No. 72-3869, pages 298-326. See particularly page 307, FIG. 9.20 and description thereof. For PLL 93 in FIG. 3 hereof, a Signetics model NE 565 was used. As indicated above the phase shifter 97 used in the PLL is a flip-flop type 7474 which serves as the divide by N counter, where N = 2, which is required by the FIG. 9.20 circuit. Further information on PLL's is obtainable from the basic book "Phase Lock Techniques", by F. M. Gardner, Wiley, New York, 1966.

Demodulation of the sync code is done by the integrated circuit exclusive OR gate 99. It gives a high level output whenever line D and line F are out of phase. Its output appears on line G which is an input to an integrated circuit shift register 100 which is a type 74195 in an actual embodiment. The outputs of register 100 appear on lines H, I, J and K, and their waveforms and phase relationships are similarly designated in FIG. 4. Lines H–K are connected as inputs to NAND gate 101. When all four of the shift register output lines are at a high level, NAND gate 101 will generate a sync pulse which appears on line L, and has the waveform and phase relationship with respect to the clock signal on line F that is illustrated in FIG. 4. The clock and sync pulse waveforms are transmitted concurrently on one of the conductors set aside for that purpose in each of the buses. Thus, the encoded signal produced by the clock pulse and sync code generator of FIG. 2 is transmitted throughout the system by means of the buses and this signal is decoded at the point of utilization by a suitable interface using the clock/sync decoder of FIG. 3. As explained earlier, in one commercial embodiment, the sync code is repeated to produce a sync pulse every 16,384 clock periods or every 250 milliseconds. Thus, there are four sync pulses per second. Each sync pulse is followed by a data word train of 2,048 digital words which train is repeated four times per second or each 250 milliseconds. A digital word may have as many bits as there are conductors for carrying such bits simultaneously in the buses. In the present case, there are eight such bit lines in the buses and, as mentioned earlier, there are ninth and tenth lines for the parity bits and clock/sync pulse waveforms, respectively. In the illustrated embodiment, data words from the various sending devices are put on the buses in a predetermined repetitive sequence. Any identified data word will always be in the same time slot relative to the sync pulse. The words are transmitted in sequential blocks of which there are 128 in one embodiment. This facilitates decoding. Each block contains 16 digital words. The manner in which the interfaces decode the words and blocks for sending or receiving by their associated devices will now be explained.

The clock/sync decoder just described in reference to FIG. 3 is used in each interface associated with devices that receive, send or both receive and send digital data. A typical receiver interface is shown in block form in FIG. 8. This interface may be one like interface 47 in FIG. 1 associated with dynamic display 45. A clock/sync decoder such as is shown in detail in FIG. 3 is shown in block form in FIG. 8 and marked 110. The encoded clock signal comes in on line 111 in FIG. 8 which is fed from line D, the output of the clock/sync generator in FIG. 2. The output from clock/sync decoder 110 consists of the continuous train of clock pulses which appear on line 113. The separated sync pulse appears on line 112. These clock and sync pulses are fed to a binary counter array which is designated generally by the reference numeral 114. The binary counters in this and all other interfaces are triggered to start counting clock pulses when they receive the sync pulse which occurs simultaneously throughout the system. A word and block timing decoder is used to count the individual digital data words corresponding with the counts produced by the binary counters and to also count the blocks. When the decoder determines that a particular data word has occurred in a particular block which it has counted, the decoder 115 produces an output pulse. Incoming digital data words consisting in this case of eight binary digits constituting the word and a parity bit come in on a 10 conductor data bus 116. As mentioned earlier, the encoded clock signal comes in on conductor 111 which is the tenth conductor of the data bus.

Figure 8:
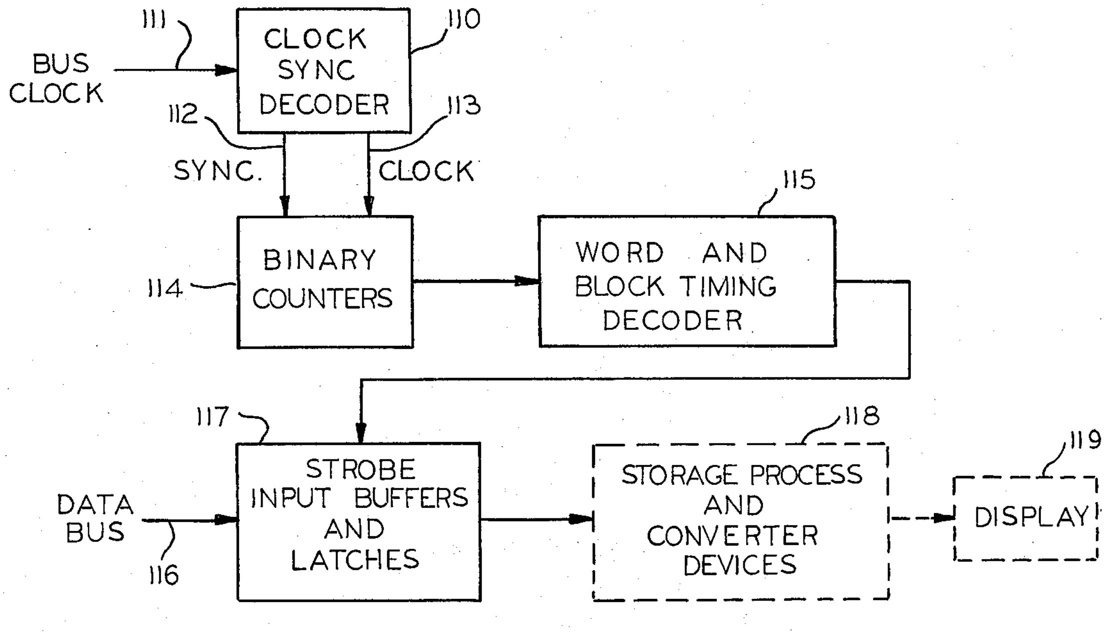
FIG. 8 is a block diagram of a typical interface unit for receiving digital data from a bus.

Each receiver interface such as in FIG. 8 has an input buffer and latches which are indicated in block form by the numeral 117. Digital words on the data bus are gated into the input buffers and latches when the timing decoder produces a strobe pulse coincident with existence on the data lines of a particular data word which is supposed to be accepted by the specific interface. By way of example, data words can be transferred from the data buses to the latches in about 120 microseconds. Of course, the block 117 in FIG. 8 which is indicated as being an input buffer and latch also has means for making a parity bit check. If parity is wrong, the strobe pulse from the decoder 115 will not enable the latches 117 to accept the data from the data bus. A transmission error in a data word will usually not affect the receiving device adversely. Depending upon the category of the data word, the same word could reappear in less than two milliseconds in the case of words from the CPU or never reappear if they are transitory waveform values or physiological parameter words but in the last two cases the last correct data remains in the latch until the new correct data arrives. In the case of system commands, which are a constant train of words, the operator would initiate the command so a data word dropout is immaterial.

In FIG. 8, a dashed line rectangle 118 defines a block which is identified as storage processing and converter devices. Such devices for storing digital data words or bits and converting it to analog form or using it to perform a particular function are known to those skilled in the art and need not be described in detail. The data, in whatever form it is processed, may be used to drive a display such as the one defined by the dashed block 119 in FIG. 8. The alphanumeric display 44 in FIG. 1 is typical of devices that can be driven with digital information transmitted from a remote source over data bus 116.

Figure 9:
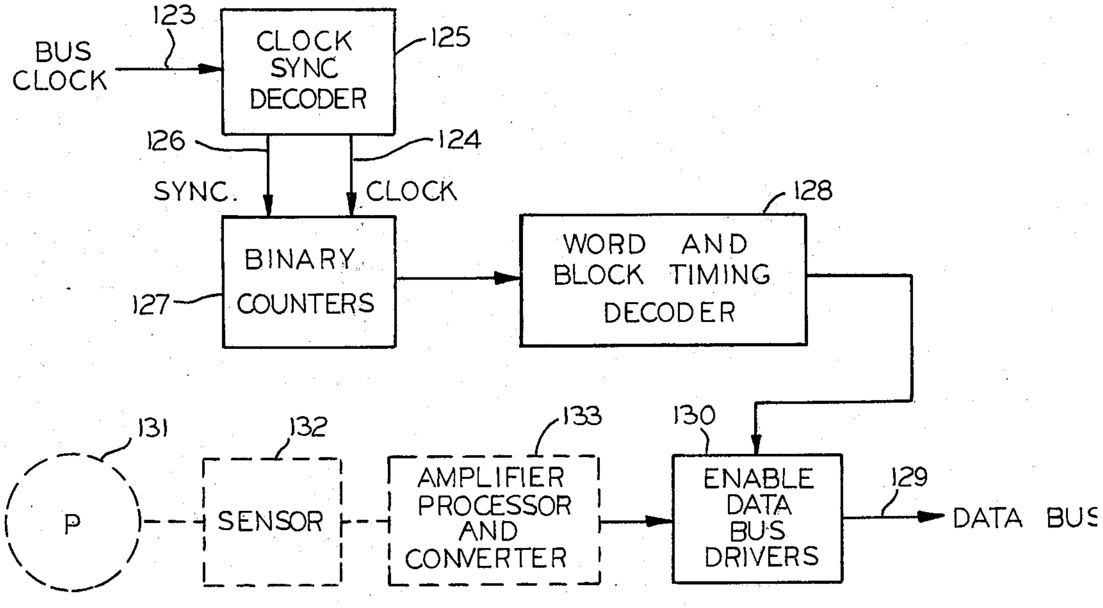
FIG. 9 is a block diagram of a typical data transmitter interface.

A typical transmitter interface such as interface 54 associated with functional block 40 in FIG. 1 is depicted in block form in FIG. 9 which will now be briefly described. This type of interface also uses a clock/sync decoder 125 which receives the encoded clock/sync signal from a data bus conductor 123. The decoder separates the sync pulse from the clock pulses and uses the sync pulses appearing on line 126 to start the binary counters 127 counting the clock pulses which are delivered from the decoder by way of a line 124. A word and block timing decoder 128 counts the clock pulses and produces an output signal at a time corresponding with the time at which the particular data words from the particular transmitter are to be placed on the transmission bus 129. In other words, when the decoder produces a strobe pulse it enables a data bus driver 130 to transfer the digital data that is available to data bus 129 in the appropriate time slot. In FIG. 9, the data may be derived from any functional unit such as a unit 40 in FIG. 1. As in the case of the previous figure, data is derived from a patient 131 by a physiological parameter sensor 132. The sensor signals are usually in analog form and, as explained previously, they are conditioned and converted to digital form in a suitable device 133 and the digital data words so produced are made available to the data bus drivers 130 for being transferred to data bus 129 in the appropriate time slot.

The system also uses interfaces which are adapted for both transmitting and receiving data to and from the buses. Such transceiver interfaces need not be described in detail since they can be readily devised by those skilled in the art in the light of the foregoing description of the individual transmitter and receiver interfaces.

Figure 10:
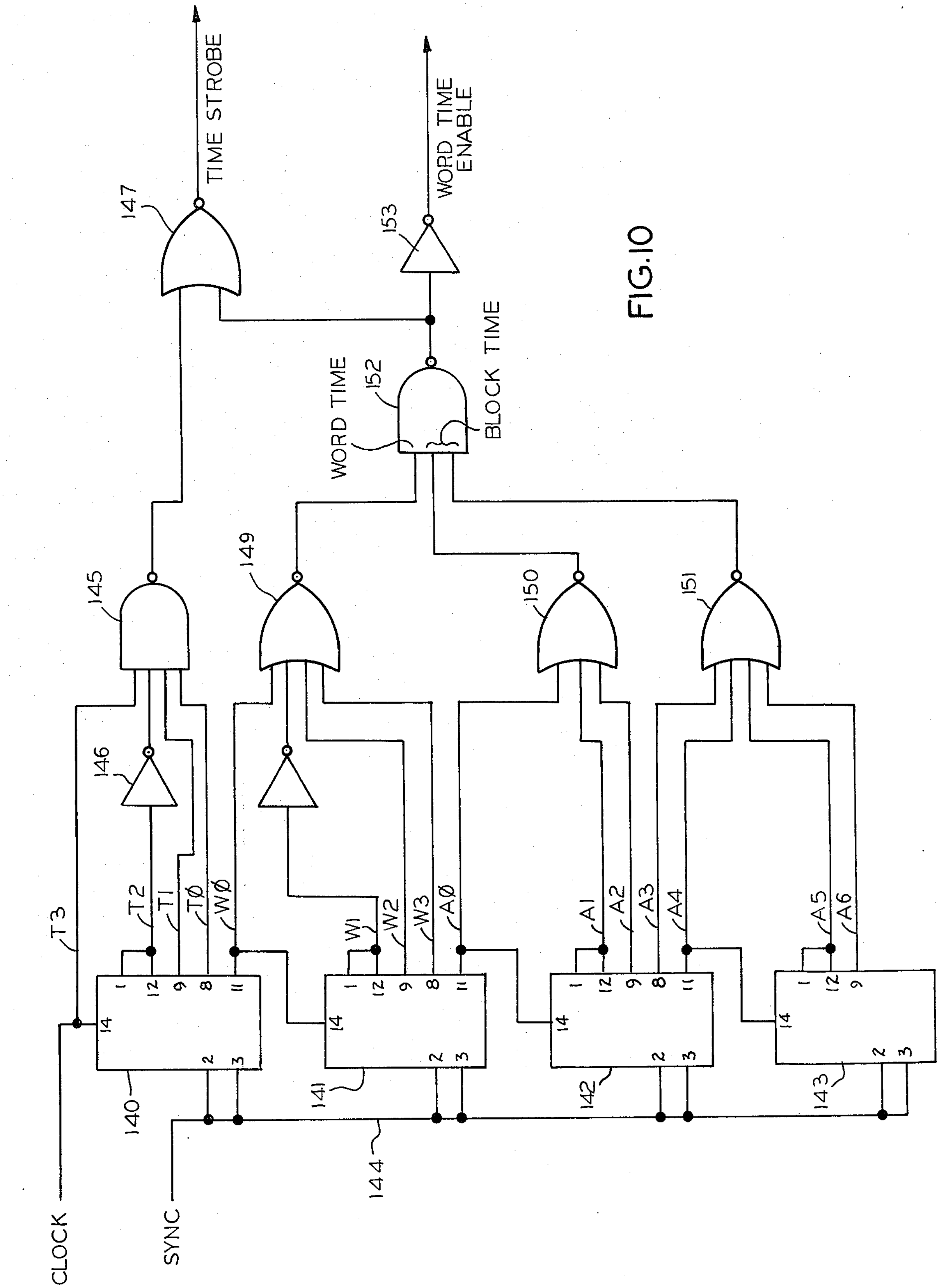
FIG. 10 is a diagram of the logic elements for counting clock pulses and decoding data words in accordance with their time slots.

A typical combination of binary counters and a word and block timing decoder is shown in FIG. 10. This combination corresponds with counters 114 and decoder 115 in FIG. 8 and with counter 127 and decoder 128 in FIG. 9. As explained in general terms heretofore, the word and block decoder takes in the various count stages of the binary counters and produces the time intervals at which the associated device is to transmit or receive data. In this particular embodiment, there are 2,048 time intervals in an array of 128 blocks, each of which has 16 digital words in prescribed time slots.

In FIG. 10, four divide by N counters are marked 140–143. Pin 14 of counter 140 receives the clock pulses from which the sync pulse has been separated. The counters are all reset to zero or enabled to count when they receive on their pins 2 and 3 a sync pulse on line 144. Certain outputs from counter 140 are designated T0 to T3. These connect to a NAND gate 145. T2 has an inverter 146 in series with it. The output of NAND gate 145 produces a pulse in the middle of a time slot that is allotted for one data word. In other words, NAND gate 145 produces an output strobe pulse in the middle of the interval when the W0 pulse is low and it produces another strobe pulse in the middle of the next interval when the W0 pulse is high. W0 is the basic frequency which determines the number of words in the train. One-half of a W0 period comprises one data word. The strobe pulse is inputted to a NOR gate 147 whose output is the time strobe pulse as indicated by the legend in FIG. 10. The reason for wanting a strobe pulse is that the latches are edge triggered and it is desirable to enter data words in the latches at the middle of the time interval during which the word exists on the data buses. This assures that the words will be transferred to or from the data buses without overlapping the next time slot.

Counters 140 and 141 in FIG. 10 have outputs marked W0–W3. These are connected to the inputs of a NOR gate 149. W0–W3 make up the 16 data words. NOR gate 149 monitors counters 140 and 141 to determine the position of the word in a block of 16 consecutive data words. Switching any two input lines W0–W3 to NOR gate 149 will cause its output to switch at a different time so that a different word in a different time slot is selected in the particular block.

Counters 141, 142 and 143 have output terminals marked A0–A6. One group of these outputs is connected to the input terminals of a NOR gate 150 and another group is connected to a NOR gate 151. NOR gates 150 and 151 select the block in which the data word of interest appears. As mentioned, in the present system there are 128 16-word blocks and this makes up 2,048 words in a train. The input connections to NOR gates 150 and 151 can be interchanged for selecting different blocks. The combination of outputs from NOR gates 149–151 is inputted to a NAND gate 152. The output of this NAND gate occurs when the right combination of word time and block time exist. In this way the time for transmitting or receiving a specified word in this time slot can be determined. The output from NAND gate 152 is fed to an inverter 153 whose output constitutes the word time enable pulse for enabling the gates which transmit data in respect to a data bus. A transmitter decoder uses all the gates shown in FIG. 10 except 145–147. A receiver would duplicate all of the other devices and would include 145–147. The output of gate 147 would operate the latches for receiving the data word.

Figure 11:
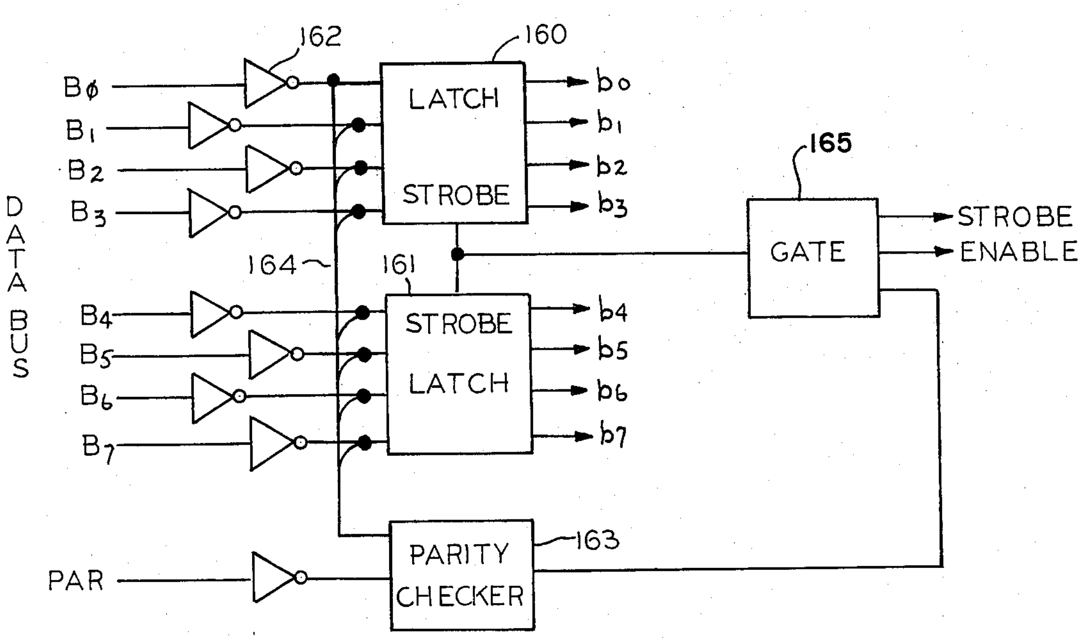
FIG. 11 is a diagram of a typical data latching arrangement.

FIG. 11 shows the latches in block form which are used in the various interfaces for holding a data word for utilization after it is removed from the bus or for transmission to a bus in the proper time slot for the designated word. In FIG. 11 there are two four-bit latches 160 and 161. The incoming digital word bits from the data bus are on a number of lines corresponding with a number of data bus conductors and are marked B0–B7. In addition to these eight data bits, there is an incoming parity bit from the ninth line of the data bus. All of the incoming lines have an inverter such as the one marked 162. A parity bit checker 163 is used to determine if the incoming data word has an odd or even number of bits. Since odd parity is used in this example, an even number of bits in a digital word would indicate error and the word would be prohibited from entering the latches. An eight conductor cable 164 has one conductor connected to each of the bit lines and to the parity checker. Accepted binary words are outputted from the latches on lines marked b0–b7, correspondingly with the input lines. The latches are enabled for accepting a word by a gate 165. The gate has the parity checker output and the strobe and enable pulses from the decoder as inputs. When the strobe occurs and the gate is enabled by the decoder, if parity is correct, the gate strobes the latches or enables the latches to accept the data from the bus.

Figure 12:
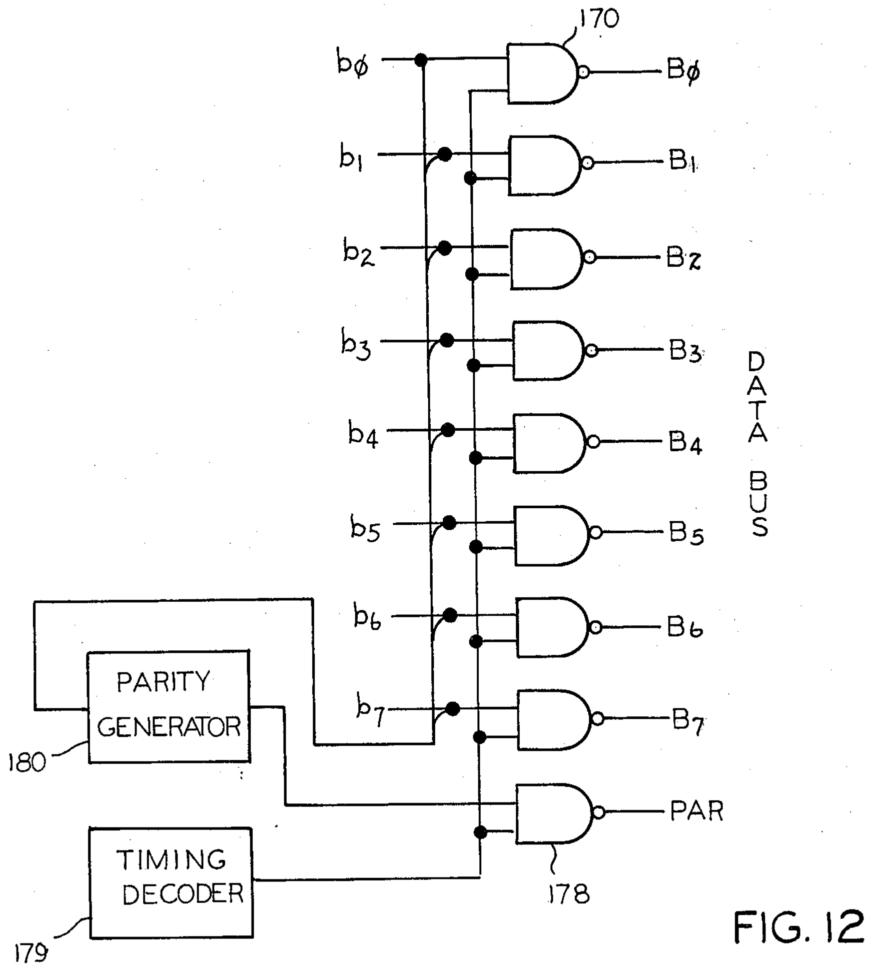
FIG. 12 is a diagram of a typical driver for transferring data to a bus.

FIG. 12 shows a block diagram of a typical data bus driver. This device is used to transfer generated data from its source to a data bus. The driver comprises nine NAND gates 170–178. Generated data bits appear on the corresponding input terminals b0–b7. These bits cannot get through the gates to outputs B0–B7 until the gates are enabled. An enable pulse from a timing decoder, marked 179 in FIG. 12, is applied to one set of corresponding inputs of the NAND gates 170–178 when the data word is to be gated in its proper time slot. The data bus driver assembly also has a parity bit generator 180 which has a multiple conductor cable 181 leading from it. One of the conductors connects to the respective input terminals of the various gates. In this manner, the parity generator determines whether the data word handled by NAND gates for bits B0–B7 has an odd or even number of bits. If the number is odd, the parity generator enables parity bit gate 178 so it produces a bit which in combination with the output bits B0–B7 is odd. In this module, when any incoming bit is present and one input terminal of a NAND gate 170–178 is high, the output of that NAND gate will be low which means that data bits are transmitted by effectively grounding the line in the data bus for that bit.

It should be appreciated that interfaces such as 48, 49 and 54 which interface functional units in a bedside station such as a typical station 10 with bedside data bus 13 are all the same basic type of interface. Interfaces 26–29 which interface functional units in the central station 11 with central station bus 17 are also the same and the same as interfaces 48, 49 and 54. Each of these interfaces have a clock and sync pulse decoder such as that shown in FIG. 3 for yielding separated clock and sync pulses. They also have data block and word decoders such as the one described and depicted in connection with FIG. 10 for yielding time strobe and word time enable pulses at a time which corresponds with a time slot or the transfer time of a digital word which the particular decoder is set to institute. The word and block timing decoder 115 in a typical receiver interface is shown related to the other components thereof in FIG. 8. It will be understood that binary counters 114 in FIG. 8 are collectively the same as counters 140–143 in decoder of FIG. 10.

The typical transmitter interface shown in FIG. 9 also has a clock/sync decoder 125 such as is shown in detail in FIG. 3. Moreover, this interface in FIG. 9 has the binary counter block 127 which represents the group of counters 140–143 in FIG. 10 and the word and block timing decoder 128 which represents the other logic circuit elements and circuitry of FIG. 10.

The strobe input buffer and latch block 117 in the receiver interface in FIG. 8 is constituted by the components of FIG. 11 where inverters 162 are the input buffers. Type 7404 inverters were used but there are other commercially available types that may be substituted. The latch in block 117 of FIG. 8 is the equivalent of the pair of four-bit latches 160 and 161 in FIG. 11. Two latches were used to permit handling eight-bit data words. Type 74175 latches were used and this type may be used for any latch in the system. Essentially, the latches are parallel access shift registers which permit applying an input to each stage simultaneously. The latches store one data word, comprised of up to eight bits at a time.

The transmitter part of the interfaces also include the data bus drivers shown in FIG. 12 and discussed in detail elsewhere herein. The receiver part of the interfaces include parity bit checkers such as 163 in FIG. 11 and the transmitter uses parity bit generators such as 180 in FIG. 12. The parity bit devices used were type 74180. Those skilled in the art know or can readily obtain information on parity bit error checking as used herein from the book "Logic Design of Digital Systems", D. L. Dietmeyer, 1971, published by Allyn and Bacon, Library of Congress No. 72-134847, particularly chapter 1.9, page 49 et. seq., and bibliography cited therein. Further information is obtainable from the classic "Error Detecting and Error Correcting Codes", R. W. Hamming, Bell System Technical Journal, Vol. 29, No. 2, April 1950, pages 147–160.

Interfaces 18–21 between respective bedside data buses 13–16 and central station data bus 17 could each comprise a set of bidirectional synchronously operated switches, one for each data bit plus one for the parity bits and the sync pulse encoded clock pulses. Thus, the set of switches in interface 18 could be closed when it is desired to transfer data from bedside bus 13 to central station bus 17 or vice versa. The other interfaces 19, 20 and 21 may be closed in sequence to transfer data between bedside station buses 14, 15 and 16 and central station bus 17. However, since there may be considerable distance between a central station bus 17 and the individual bedside buses 13–16 it is preferable to amplify the individual bit currents to overcome drop caused by line impedance and to improve the signal to noise ratio. The interfaces between buses also provide for isolation against high voltage which might be accidentally applied to devices in the system.

Although the components are not shown, an interface for between buses may comprise a driver and receiver combination at each end having their outputs and inputs, respectively, connected to the primary windings of isolating pulse transformers. There is one such arrangement for each data bit and for the clock/sync pulses. The transformer secondaries are connected by the long lines between remote buses. When the driver at one bus is enabled by a synchronizing clock pulse the receiver at the other bus is enabled simultaneously. The system may also operate conversely so data can be transmitted in either direction. Digital signal isolation techniques are discussed in the magazine "Instrumentation Technology" July 1973, pages 60 et seq.

Interfaces 32 and 37 which interface central station bus 17 with CPU station bus 31, except for their timing are essentially the same as interfaces 18–21.

The buses in this system carry five different categories of information. The first category is system commands. These commands can originate in three different locations: the bedside keyboard 46, the central keyboards 23 or the CPU. These commands may set new alarm limits, change the display format, initiate test or calibration procedures and control peripheral equipment for example. The basic system command consists of an eight bit command word plus a parity bit. Each command consists of special code bits that indicate its destination and type. The code bits are used by the system components to identify those commands addressed to them. In an eight bit command word, the four least significant bits may constitute the command, the next two most significant bits may indicate the type of command; that is, whether it is sequential for general control, or numeric. The two most significant bits are used to indicate the destination; that is, whether the command is to go to the bedside display, central station, computer or elsewhere in the system. In the data bus format shown in FIG. 5 which will be discussed in detail later, the system command words are designated by the letters KA to KD. The system commands have the purpose of getting a subsystem to respond to the operator, for example, to turn on a strip chart recorder at the central station 11 from the bedside station 10 or to get information from the CPU 33. System commands are generated only once.

Within the category of commands is another type called the direct line command (DLC) for convenience. Whereas the system commands are usually expressed in terms of a three digit octal code word, the direct line commands are generally expressed by changing single bits in a word. DLC commands are continuously generated until canceled by the operator. Use is typified by making a system test by depressing the suitable test button, not shown, on one of the keyboards 23, 46 which commands setting the function blocks such as 40 to produce stored test data for calibration purposes. Each bit in this command category is sent at a fixed repetition rate as a continuous bit stream for as long as the input device is activated. The receiving unit converts the bit stream into a sustained logic level that is held as long as the bit stream continues. Direct line words are designated in the data bus format of FIG. 5 by the letters DL followed by a pair of further letters indicating the individuality of the command. The term direct line is employed to signify that the continuous bit train imposed on the bus has the operative effect of a wire directly connecting the sending unit and receiving unit of the command.

Another category of information includes the measured physiological parameter values. A purpose of the system is to measure and derive parameter values and display them for medical use. The data communication carries these parameters represented by digital words, from where they are derived to where they are used or displayed. It also carries indicators for system alarms, trend values and trend alarms. Data indicating the trend of a parameter is stored in the CPU and associated information is so extensive that most parameters must be expressed in three consecutive words as indicated by the consecutive designations PA0, PB0 and PC0 in the 16 word set or block zero (BK0) in FIG. 5. The next in the series of 128 available parameter slots in block BK1 is designated PA1, PB1 and PC1 and so on through the blocks 0–127. One may see that these parameter values are each repeated four times per second since the entire train of data constituting 2,048 words is repeated four times per second. PA and PB come from a function block and PC comes from the CPU.

Referring to FIG. 7 where the bit assignment for the data structure is shown, the interpretation is: P0–P9 is a binary number giving absolute parameter value; PB has a sign bit 0 if positive and 1 if negative; T0–T5 is a binary number giving the computed trend value from the CPU; PC is a sign bit of the trend value, 0 if positive and 1 if negative; the trend limit alarm is a CPU generated flag bit, 1 if a trend alarm condition exists; parameter select relates to display control bits, 1 if the parameter has been selected; and, four individual system alarms, B6 and B7 in both PA and PB.

The parameter value, system alarm code and parameter select bit are generated in a function block. The trend value and trend alarm bit are generated by the CPU. Each data format location within the parameter channel is preassigned by the system structure to a specific parameter. If the function block designated to generate a given parameter is not in the system, PA and PB for that parameter number will be unused. If there is no CPU in the system, PC will not be used. There cannot be a PC, of course, if there is not a PA and PB for a given parameter.

Another category of information transmitted by the buses is computer generated data. This data is designated by CA, CB, CC and CD in each block of words as is evident in FIG. 5. The computer data category involves transmission of display format data from the CPU to one of the displays. For instance, it may be desired to command the computer to display a graphical plot of a derived parameter. Recall that a display usually shows a current value of a physiological parameter, but the computer stores this information and will later send out digital data providing the proper row and column location of points to compose a graphical display. Thus, the display formats used by the computer are unstructured, allowing it to determine the specific row and column location for each character it sends to the display. Each data transmission consists of a 36 bit data field composed of 9 bit words including parity. The bit assignment in the words may be seen in FIG. 7. Row CA provides the address of the character location in the display format. The row information digits R0–R4 in FIG. 7 compose the first word CA in each of the blocks 0–127 in FIG. 5. CB designates the column address of the character location in the display format. CB consists of 6 bits as can be seen in FIG. 7 and is the second word in each of the blocks in FIG. 5. The type of character code, that is, whether it is ASCII code or graphical code is designated by CC in the bit assignment and one may see in FIG. 7 that 6 bits are used to provide this information to the display. Supplemental information on character size, type and other information as can be seen in the bit assignment chart of FIG. 7 are designated by CD which appears as the tenth word in each block in FIG. 5. Note that individual bits B0–B4 comprise these computer data words but that the bits in each word are given a specific assignment. In other words, individual bits convey the operating information rather than the word itself.

The fifth category of information used in the system includes flag words which are used to provide a fast response to a condition that occurs somewhere in the system. The flag words are designated FA and FB. By referring to FIG. 5, one may see that FA repeats at the rate of 512 times per second and FB at 1024 per second. The flag bit words have 8 bits but there is no association between the bits. Each bit represents special information. For example, every time an R-wave is recognized as being present in the ECG, a flag word bit is set. The computer uses this information for some other activity. Specific flag bit assignments are as follows: a high limit alarm bit indicates an alarm condition for the parameter immediately preceding this flag; low limit alarm indicates the same for the parameter immediately preceding this flag; blank page confirm indicates the computer data transmission sent in the preceding computer data category CA, CB, CC and CD was correctly received by the display; WA and WB indicate when the following waveform channel is being used to send active data; SUS indicates or flags a systolic upslope from an arterial pressure function block; and the R-wave flag indicates the ECG function block has detected an R-wave.

What might be considered another category of information is that which expresses the digitization of waveforms for transmission to the various displays and to the computer. There are means for providing high resolution waveform samples WA and medium resolution waveform samples WB. WA has two channels, WA0 and WA1, each providing 512 eight bits, with parity, dynamic waveform samples per second. This provides a frequency response in excess of 100 Hz.

The medium resolution dynamic waveform samples WB0–WB7 each provide 128 bits per second, with parity. This permits a frequency response in excess of 25 Hz.

Figure 5:
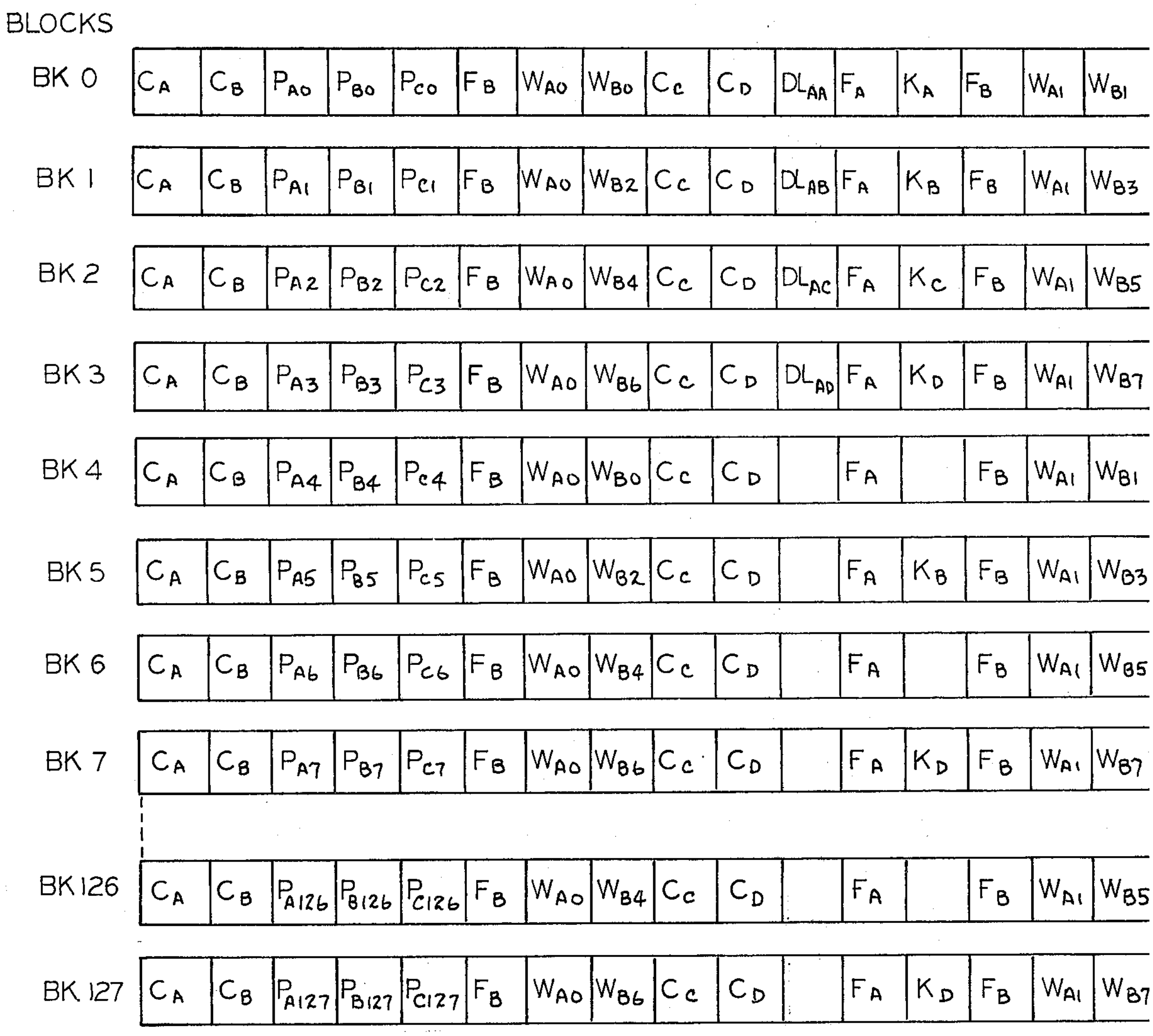
FIG. 5 shows the format in which information appears on the data bus in accordance with one embodiment of the invention.

One may see in the FIG. 5 data bus format that high resolution waveform words WA0 and WA1 appear in each block and since there are 128 blocks occurring four times per second there are a total of 512 waveform samples per second. FIG. 5 also shows how WB0–WB7 appear in every fourth block so for these there are 128 samples per second.

Conversion of analog waveform values to digital is a process well known to those skilled in the art so that it will not be elaborated nor will the equipment for performing this process be discussed. Suffice it to say that the analog-to-digital converters receiving the dynamic waveforms in the function blocks are running in reference to an independent clock so the intervals between samples are fixed and uniform. The information put on the buses is simply representative of the waveform amplitude at each clock pulse cycle. At a bedside station, for instance, a function unit derives analog waveform information and converts it to digital information. At the receiving end, such as at the display 43 in FIG. 1, the digital information is reconverted to analog form. To avoid steps in the waveform when it is recomposed for display, the original wave must be sampled at a frequency that is higher than the highest frequency component in the waveform. Usually it is desirable to sample at a rate of 4 to 5 times the highest frequency. Thus, in the present system where the ECG wave highest frequency component is around 40 Hz, a sampling rate of 256 per second could be used but a rate of 512 per second is actually used to permit accommodating future devices whose waveforms have a fundamental frequency of 100 Hz or a little more.

To recompose a smooth analog curve from digital data one must be concerned with the increment between two successive digital values or samples. Where each analog sample is converted and expressed in eight binary bits a resolution of 256 bits is obtainable with unique codes which set unique amplitudes. Thus, good vertical resolution is easily obtainable.

Figure 6:
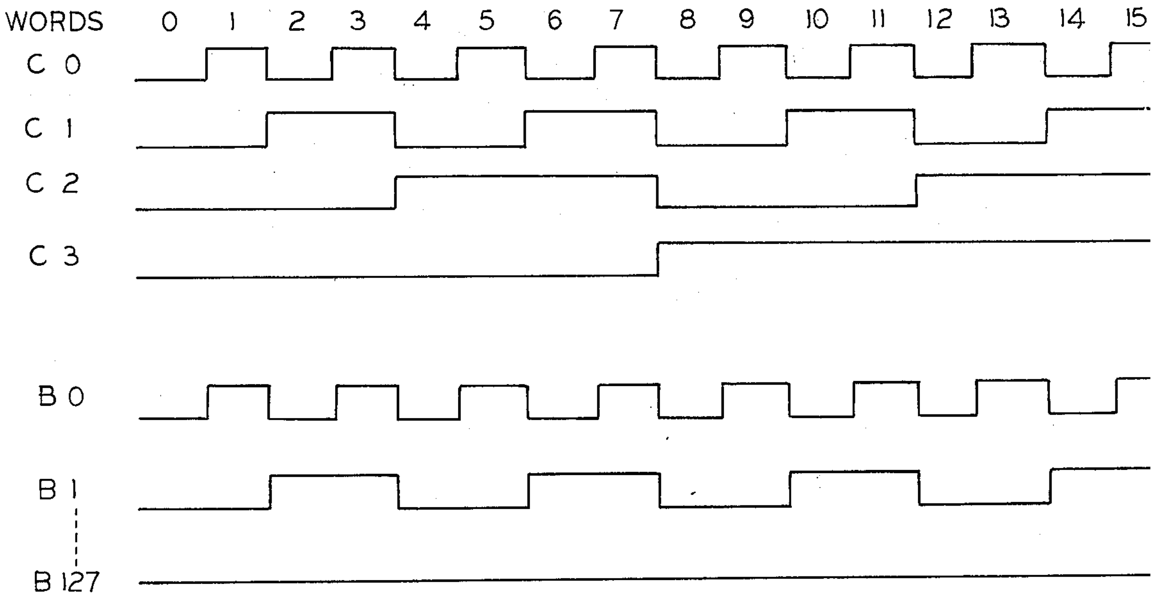
FIG. 6 shows some waveforms which are useful to explain how the sequentially presented data words referred to in the preceding figure are identified coincidentally by the sender and receiver of the data.

Now that the data word sequence presented substantially repetitively and synchronously on the bus system has been described in reference to FIG. 5, the timing functions of the counters and decoders in the interfaces will be re-examined in reference to FIG. 6. Also reconsider FIG. 10. In connection with FIG. 10 there was an explanation of how the NOR gates 149–151 cooperated with the counters 141–143 to produce an enabling pulse for gating digital data to or from a bus, for instance. Also mentioned was the fact that gates 149–151 could have their inputs variously connected to produce an enabling pulse for transferring each word in the series of words in FIG. 5 in its proper time slot.

In FIG. 6 the 16 data word time slots have the column numbers 0–15. The first row is marked C0 and its frequency is 1/16 of the clock frequency. The waveform C0 appears repetitively on one counter output and the waveforms C1–C3 appear as shown in FIG. 6 on the other W or word count terminals of the counters. Thus, if with a first combination of W inputs to gate 149 it will see the waveform condition in column zero, which is a coincidence of four binary zeroes which is the code for word 0. If the inputs to gate 149 were differently connected they would produce an output enable pulse when the column 1 time relationship existed which is binary 1000. Similarly for column 2 which would be a connection of the gate 149 to produce a word enable pulse for binary 0100 and so forth for the other words in the series of 16 in each block.

The blocks in which the words exist are similarly determined: In FIG. 6 the waveforms for the block determination are designated B0 to B127 for the 128 blocks. The seven inputs A0 to A6 of NOR gates 150 and 151 can be variously connected to produce an output pulse for combining with the word pulses to select the proper word in accordance with the block it is in. Here, block B0 would be designated by binary 0000000 and block B127, the 128th block would be designated by binary 1111111. In this manner the interfaces can select any data word or words to which it is set.

Although numerical values have been used throughout this specification for the sake of explaining the principles of the new patient data system in relation to concrete rather than abstract examples and although a specific embodiment of the system has been described in detail, it will be understood that such description is intended to be illustrative rather than limiting, for the invention may be variously embodied and is to be limited only by construction of the claims which follow.

We claim:

1. A patient monitoring and data handling system for use with hospitalized patients, comprising:

a. a plurality of data sending units for being placed in the vicinity of a hospitalized patient and having means for producing digital data words representative of information pertinent to a patient and a plurality of data receiving units for being placed in the vicinity of said patient and having means for receiving digital words pertinent to monitoring a patient, each of said digital words being assigned to a particular time slot in a sequence of time slots, b. first data bus means having a conductor for each bit in a data word to permit parallel transmission of the bits comprising a word, c. means for connecting said sending and receiving units, respectively, to said data bus, said last named means each including gate means and gate enabling means associated with each sending and receiving unit for selectively transmitting data words between an associated sending unit and said data bus and between said data bus and an associated receiving unit when gate means associated with a sending unit and gate means associated with a receiving unit are simultaneously enabled in time correspondence with occurrence of a time slot to which the word to be transmitted is assigned, d. a source of constant rate clock pulses, said clock pulses corresponding with said sequence of time slots, e. means for generating a sync pulse signal in response to occurrence of repeatable numbers of clock pulses, f. pulse counting means associated with each sending and receiving unit and each counting means responding to occurrence of each sync pulse signal by simultaneously initiating counting of clock pulses and continuing to count selected predetermined numbers of ensuing clock pulses so that a counting means associated with at least one of said receiving units reaches its predetermined number of counts in coincidence with counting means associated with at least one sending unit reaching its predetermined number of counts between which units data assigned to a time slot corresponding with occurrence of said coincidence may be exchanged, g. the said gate means associated with the said ones of said sending and receiving units, respectively, being enabled to respond to said coincidence for said transmitting of said data words and other of said gate means for words assigned to other time slots being enabled sequentially in response to other coincidences at predetermined times whereby respective sending units operate synchronously with receiving units that are intended to receive data from said sending units.

2. The system set forth in claim 1 including:

a. latch means for storing one of said digital word signals, said latch means being coupled to one of said gate means.

3. The system set forth in claim 2 wherein:

a. at least one of said bedside station receiving units includes oscilloscope display means for displaying said parameter in correspondence with its original analog form, and b. digital-to-analog conversion means associated with said display means for converting parameter indicative digital words to corresponding analog signal for driving said oscilloscope display means.

4. The system set forth in claim 2 wherein:

a. at least one of said bedside station receiving units includes oscilloscope display means for displaying said parameter in alphanumeric form, and b. means for converting said parameter representative digital word signals to signals for driving said alphanumeric display means.

5. The system set forth in claim 1 characterized by:

a. a bedside station including at least one of said sending units and at least one of said receiving units, b. said bedside station sending unit comprising a functional unit including input means for coupling to a patient parameter sensing device to derive analog signals therefrom representative of a patient parameter, c. each of said functional units including analog signal conditioning means, analog-to-digital word conversion means responsive to said analog signals, digital word storage means and interface means and means for coupling and uncoupling each of said functional units to and from said data bus means independently of any other units connected to said bus means.

6. The system set forth in claim 1 characterized by:

a. a bedside station including at least one of said sending units comprising a keyboard means, said keyboard means being operative to produce predetermined unique selectable system command digital words for being transmitted by way of said data bus means to a receiving unit for controlling said receiving unit.

7. The system set forth in claim 1 wherein:

a. said data bus means conductors have a single conductor for said clock pulse and said sync pulse signals and a conductor for each binary digit comprising a digital word.

8. The invention set forth in claim 1 including:

a. means associated with each sending unit for establishing a parity bit for each digital word sent to said bus, b. means at each receiving unit for checking the parity of each received word, and c. said data bus conductors including a single conductor for said clock pulse and sync pulse signals, a conductor for parity bits and a conductor for each binary digit comprising a word.

9. The system set forth in claim 1 wherein:

a. said data bus comprises no more than 10 conductors.

10. The system set forth in claim 8 wherein:

a. said data bus comprises no more than 10 conductors.

11. The system set forth in claim 2 including:

a. a central station for monitoring the condition of one or more patients at said bedside station and for displaying and generating data, b. said central station including receiving unit means comprising oscilloscope means for displaying data in alphanumeric form said data corresponding with data represented by digital words from said selected ones of said sending means, c. said central station including receiving unit means comprising oscilloscope means for displaying dynamic waveforms represented by digital data words from sending units in the system and including receiving unit means comprising means for converting digital data from said sending means to a corresponding analog signal and strip chart recorder means responsive to said last named analog signal by producing hard copy of physiological waveforms represented by said digital data words from sending units in the system, d. central data bus means associated with said central station and having a plurality of conductors, e. a plurality of interface means respectively coupling said receiving units to said data bus means at said central station, and f. means including interface means for coupling said central station data bus means and said first data bus means.

12. The system set forth in claim 11 including:

a. sending unit means comprising keyboard means in said central station, said keyboard means being operative to produce digital data words representative of commands and data for use by selected receiving units in said central station and said bedside station, and b. interface means coupling said keyboard means to said central station data bus means.

13. The system set forth in claim 1 including:

a. a central station for monitoring the condition of one or more remotely located patients and for displaying and generating data, b. at least one sending unit and at least one receiving unit in said central station, c. central station data bus means, d. a plurality of interface means for coupling said units, respectively, in said central station to said central station data bus means, and e. means for coupling said central station data bus means to said first data bus means.

14. The system set forth in claim 13 wherein:

a. said bedside data bus means and said central station data bus means have the same number of conductors.

15. The system set forth in claim 13 including:

a. a processing unit station remote from said central station and said bedside station, b. computer means at said processing unit station, c. processing unit station data bus means, d. interface means coupling said computer means to said processing unit data bus means to permit bidirectional exchange of data words between said computer means and said processing unit station data bus means, and e. means coupling said processing unit station data bus means to said central station data bus means.

16. The invention set forth in claim 15 wherein:

a. said processing unit station data bus means and said central station data bus means have the same number of conductors.

17. A system for handling data pertinent to at least one hospitalized patient, said system being characterized by having at least one bedside station to which said patient may be in proximity and including one or more digital data sending units and one or more digital data receiving units, said units being operative to send and receive data respectively during existence of a time slot assigned to said units from a sequence of time slots, said system being characterized further by use of a data format wherein discrete digital data words used in the system are assigned to said time slots, respectively, said system further comprising:

a. means associated with said sending unit for producing digital data words representative of information pertinent to said patient, b. data bus means associated with said bedside station, said bus means having at least as many conductors as there are bits in the data word having the largest number of bits of any word to be sent in said system to permit parallel transmission of the bits comprising a word, c. said data sending units and said data receiving units being at said bedside station, d. means for controlling said sending units to transmit digital data words to said data bus during the existence of the time slots to which said words are respectively assigned and means for controlling said receiving units to accept from said data bus only those digital words in time slots corresponding with their respective assigned time slots whereby to effect selective transmission of words exclusively from a designated sending unit to one or more receiving units, e. a source of a clock pulse train and means for encoding sync pulse information periodically in said pulse train, f. means for coupling said sync pulse train to one of said data bus conductors, g. decoding means associated with each of said sending and receiving units, respectively, said decoding means being settable, respectively, to produce a control pulse corresponding in time with a predetermined time slot, and h. gate means coupling said sending and receiving units, respectively, to said data bus, said gate means being responsive to coincident control pulses at said sending and receiving units to gate the word assigned to the determined time slot from said sending unit to said data bus and from said bus to said one or more receiving units within the same time slots.

18. The system set forth in claim 17 wherein:

a. at least one of said sending units at said bedside station comprises:

1. a functional unit including input means,
2. physiological parameter sensing means adapted to be coupled to a patient for producing an analog signal that is functionally related to said parameter, said analog signal being coupled to said input means,
3. analog-to-digital conversion means for converting samples of said analog signal to corresponding digital words comprised of binary signals, and
4. means for coupling said digital words to said gate means, whereby response of said gate means to predetermined control signals will place said words during their assigned time slots on said data bus means.

19. The system set forth in claim 18 wherein:

a. at least one of said receiving units at said bedside station comprises analog signal display means including oscilloscope means, and b. said receiving unit having means for converting digital word signals taken from said bus during predetermined time slots to signals for driving said oscilloscope means whereby to recompose said analog signal.

20. The system set forth in claim 17 wherein:

a. at least one of said sending units at said bedside station comprises:
1. means for receiving a waveform representative of a physiological condition of a patient,
2. means for successively sampling the amplitude of said waveform and means for converting waveform amplitudes to digital representations thereof, and
3. said decoding means associated with said last named sending means being set to operate corresponding gate means so as to couple to said data bus means in rapid succession digital words representations of the existing amplitude of said waveform.

21. The system set forth in claim 20 wherein:
a. said decoding means include means which are set to decode consecutive blocks comprised of equal numbers of digital words, the number of blocks times the number of words in a block constituting the number of words in a train which corresponds with the number of time slots, and
b. said decoding means producing a control signal for said gate means for corresponding time slots in each block, said digitized waveform samples occurring in each block at least once to thereby provide for high resolution of said waveform.

22. The system set forth in claim 21 wherein:
a. there are 128 blocks in a work train and the clock pulse frequency is such that said blocks are repeated at least 4 times per second whereby to obtain waveform resolution of 512 samples per second.

23. The system set forth in claim 20 wherein:
a. said decoding means includes means which are set to decode consecutive blocks comprised of equal numbers of digital words, the number of blocks times the number of words in a block constituting the number of words in a train,
b. said decoding means producing a control signal for said gate means for corresponding time slots in every fourth block, and
c. there being 128 blocks occurring 4 times per second whereby said time slots for said digitized waveform samples occur at the same medium resolution rate of 128 sampes per second.

24. The system set forth in claim 17 wherein:
a. said sync pulses occur 4 times per second and the clock pulse frequency is such that 2,048 time slot defining pulse intervals defining a train of an equal number of data words occur between each of said sync pulses.

25. The system set forth in claim 17 wherein:
a. at least one of said sending units is adapted to send direct line commands to a predetermined receiving unit in said system to effect operation of said receiving unit,
b. means in said sending unit for producing selected digital words constituting an encoded command signal, and
c. said command signals being assigned to time slots which are repeated at equal intervals of time slots whereby to provide a sustained train of the same command signals.

26. The system set forth in claim 17 wherein:
a. said train of time slots is divided into blocks of time slots each of which is comprised of a predetermined equal number of time slots for digital words, each block having a predetermined word time slot for one or more system command words corresponding in position with the time slot for those words in the next ensuing block, and
b. said decoding means for said sending and receiving units, respectively determining each time block and a producing said control pulse upon occurrence of said command words, whereby a particular command word may be presented one or more times in each block so as to provide substantially continuous selected commands from said sending unit to said receiving unit.

27. The system set forth in claim 17 wherein:
a. said data bus has no more than 10 conductors, 8 for said word bits, 1 for said sync signal encoded clock pulses and 1 for parity bits.

28. The system set forth in claim 17 including:
a. a central station remote from said bedside station, said central station having at least one of said sending units and at least one of said receiving units,
b. a central station data bus means,
c. means coupling said central station sending and receiving units to said central station data bus, and
d. means coupling said central station data bus to said bedside station data bus.

29. The system set forth in claim 28 wherein:
a. at least one of said central station receiving units comprises data display means including oscilloscope means, and
b. means for converting selected ones of said digital data words received by said unit to signals for controlling said oscilloscope means.

30. The system set forth in claim 28 including:
a. a central processing unit station remote from said central station,
b. said processing unit station including computer means for storing data generated by said sending units and for generating new data from said stored data such that said new data may be transferred to at least one of said receiving units,
c. said processing unit station including data bus means, and
d. means for coupling said central station data bus means to said processing unit station data bus means.

31. The system set forth in claim 28 wherein:
a. said bedside station data bus means and said central station data bus means have an equal number of conductors.

32. The system set forth in claim 30 wherein:
a. all of said data bus means have an equal number of conductors.

33. The system set forth in claim 30 wherein:
a. all of said sending and receiving unit means are connected in parallel with their associated bus means to enable adding or removing sending and receiving units without affecting data word exchanges between pre-existing predetermined ones of said units or units which remain, respectively.

34. The system set forth in claim 1 wherein at least one of said means for producing digital words is constructed and arranged to produce said words at one predetermined rate and at least another of said means for producing digital words is constructed and arranged to produce said words at another predetermined rate, said rates depending on the demands of the system for the type of data sent by said one and another means.

35. The system set forth in claim 1 including a plurality of functional units at said bedside station in proximity with said patient, at least one of said functional units including sensor means adapted to be coupled with said patient to derive analog signals representative of a physiological parameter of said patient, means for converting said analog signals to parameter representative digital words for being gated to said data bus.

36. The system set forth in claim 1 including means for producing system command words for being gated to said bus to control said system, said command words being assigned to individual time slots.

37. The apparatus set forth in claim 36 wherein said commands producible by said command word producing means include direct line commands characterized by digital words comprised of selected ones and zeros, means coupled to said bus and subject, respectively, to being commanded selectively to perform a function in correspondence with a particular bit position in said word being a one or a zero, said particular bits thereby constituting continuous bit streams representing individual commands.

38. The apparatus set forth in claim 36 wherein said commands producible by said command word producing means include digital data words comprised of zero and one bits, said words being assigned to particular time slots, said words respectively comprising code bits corresponding with the type and destination of the command and command bits corresponding with the command.

39. The apparatus set forth in claim 38 wherein at least some of said command words, respectively, are selected from a class of words corresponding with commanding setting of alarm limits, changing data display formats, initiating test procedures and controlling a strip chart recorder.

40. A system for monitoring hospitalized patients and for transmitting data pertinent to said patient in and between a bedside station and one or more stations remote from said bedside station, comprising:

a. means at said bedside station for obtaining from a patient at said station signals representative of information pertinent to said patient, b. means for converting said signals to data words in binary digital form, each of said words being assigned to a particular time slot in a sequence of time slots, c. data bus means at said bedside station having a plurality of conductors including at least one conductor for each bit in a data word to permit parallel transmission of the bits comprising a word, d. at least one data sending unit and at least one data receiving unit at said bedside station, e. said sending unit including gate means selectively operable to gate converted digital words produced by said converting means onto said data bus at times corresponding with the time slots to which the digital words are respectively assigned, f. said receiving unit including gate means selectively operable to gate digital words off of said data bus at times corresponding with the time slots to which the digital words are respectively assigned, g. means associated with said receiving unit for utilizing digital words gated from said bus, h. a second station situated remotely from said bedside station and having at least one data receiving unit, i. second data bus means at said remote station and having a plurality of conductors including at least one conductor for each bit in a data word to be carried thereby to permit parallel transmission of the bits comprising a word, j. said remote receiving unit including gate means selectively operable to gate digital words off of said second data bus at times corresponding with the time slots to which the digital words are respectively assigned, k. means associated with said remote receiving unit for utilizing digital words gated from said second data bus, and l. means for coupling said bedside station data bus to said remote second data bus.

41. The system set forth in claim 40 including:

a. a source of constant rate clock pulses, said clock pulses corresponding, respectively, with said time slots in said sequence, b. means for generating a sync pulse in response to occurrence of a repeatable number of clock pulses, c. pulse counting means associated with each sending and receiving unit, each counting means responding to occurrence of each sync pulse by simultaneously initiating counting of clock pulses and continuing to count selected predetermined numbers of ensuring clock pulses so that a counting means associated with at least one of said receiving units reaches its predetermined number of counts in coincidence with counting means associated with at least one sending unit reaching its predetermined number of counts between which units digital data words corresponding with occurrence of said coincidence may be exchanged, d. said gate means associated with said sending and receiving units, respectively, being enabled to respond to said coincidence for gating said data words of a particular time slot and prohibiting gating of words assigned to other time slots.

42. The system set forth in claim 40 including:

a. means at said second station for generating digital data words which are assigned to a predetermined time slot, b. a sending unit including gate means selectively operable to gate digital words from said word generating means to said second data bus at times corresponding with the time slot to which the words from said generating means are assigned.

43. The system set forth in claim 42 including:

a. a source of constant rate clock pulses, said clock pulses corresponding, respectively, with said time slots in said sequence, b. means for generating sync pulses in response to occurrence of a repeatable number of clock pulses, and c. counting means associated with said last named sending unit for counting clock pulses from said source upon occurrence of a sync pulse and responsive to counting a predetermined number of pulses up to the one corresponding to the time slot of the word from said sending unit by enabling said last named gate means for gating said word to said second data bus means.

44. The system set forth in claim 40 including:

a. one or more additional bedside stations, b. data bus means at each of said additional stations for transmitting digital data words pertinent to said patient to and from said station, each of said data bus means having a conductor for each digit in said words, and c. means for coupling said data bus means of each additional station to said second data bus means at said remote station.

45. A system for generating and for utilizing data pertinent to a hospitalized patient, comprising:

a. a bedside station and means at said station for producing binary digital words representative of information pertinent to said patient in said station, said words being assigned to a discrete time slot, b. a remote station, c. means at said bedside station for utilizing digital words pertinent to said patient and produced at said station or at a remote station, said utilizing means using words assigned respectively to a discrete time slot, d. means at said remote station for producing binary digital data words pertinent to said patient, said words being assigned respectively to a discrete time slot, e. means at said remote station for utilizing digital data words pertinent to said patient, said words being assigned respectively to a discrete time slot, f. first data bus means at said bedside station and a second data bus means at said remote station, each of said data bus means having a plurality of conductors including one for each bit in said digital words that are to be transmitted by said buses, g. means for interconnecting said buses, h. means for generating a repeatable train of clock pulses and means for producing a sync pulse periodically in response to occurrence of repeatable numbers of clock pulses, each of said clock pulses corresponding with a discrete time slot, i. means for coupling said sync pulse and clock pulse train to one conductor in said data buses, respectively, j. coupling means for coupling each of said digital word producing means and each said digital word utilizing means to one and another of said data bus means, each of said coupling means including gate means for being enabled selectively to gate digital data words to and from said data bus means, k. pulse counting means for each coupling means, sid pulse counting means each receiving said sync and clock pulses and each counting a preset number of clock pulses up to the assigned time slot for a digital word that is to be produced or used by said producing and utilizing means, respectively, all counting means reaching the same time slot coincidentally causing the gate means of word producing and word utilizing means whose words are assigned to said time slot to become enabled and other of said gate means for words assigned to other time slots becoming enabled sequentially when other coincidences occur.

* * * * *